US007463639B1

(12) United States Patent
Rekhter

(10) Patent No.: US 7,463,639 B1
(45) Date of Patent: Dec. 9, 2008

(54) EDGE DEVICES FOR PROVIDING A TRANSPARENT LAN SEGMENT SERVICE AND CONFIGURING SUCH EDGE DEVICES

(75) Inventor: Yakov Rekhter, New Rochelle, NY (US)

(73) Assignee: Junpier Networks, Inc., Sunnyvale, CA (US)

( * ) Notice: Subject to any disclaimer, the term of this patent is extended or adjusted under 35 U.S.C. 154(b) by 1271 days.

(21) Appl. No.: 10/123,353

(22) Filed: Apr. 16, 2002

Related U.S. Application Data

(60) Provisional application No. 60/325,344, filed on Sep. 26, 2001.

(51) Int. Cl.
*H04L 12/28* (2006.01)
*H04J 3/22* (2006.01)
*G06F 7/00* (2006.01)

(52) U.S. Cl. .............................. 370/409; 370/467; 707/6
(58) Field of Classification Search ................. 370/466, 370/469, 498, 395.5, 401, 392, 389, 412, 370/400, 409, 467, 474; 707/1, 2, 3, 6
See application file for complete search history.

(56) References Cited

U.S. PATENT DOCUMENTS

| | | | | |
|---|---|---|---|---|
| 5,920,705 A | * | 7/1999 | Lyon et al. | 709/240 |
| 6,473,421 B1 | * | 10/2002 | Tappan | 370/351 |
| 7,012,919 B1 | * | 3/2006 | So et al. | 370/392 |
| 7,068,654 B1 | * | 6/2006 | Joseph et al. | 370/392 |
| 7,136,374 B1 | * | 11/2006 | Kompella | 370/352 |
| 2001/0049739 A1 | * | 12/2001 | Wakayama et al. | 709/230 |
| 2004/0202171 A1 | * | 10/2004 | Hama | 370/395.1 |

OTHER PUBLICATIONS

"Transparent LAN Service as an Alternative to Frame Relay", (Sep. 16, 1999) downloaded from: http://www.larson.com/support/techlib/tlsfr.htm on Feb. 5, 2002, 2 pgs.

T. Jenkins, J. Phillips, "Transparent LAN Service as an Alternative to Frame Relay", *Network Fusion News* (Apr. 10, 1998), downloaded from: http://www.nwfusion.com/newsletters/frame/0413frl.html on Feb. 5, 2002, 3 pgs.

Zvon, "VPN Types: Virtual Private LAN Segment", *RFC 2764*, Section 7, downloaded from: http://www.zvon.org/tmRFC/RFC2764/Output/chapter7.html on Feb. 5, 2002, 5 pgs.

"Introduction to Networking: and Data Communications", downloaded from http://www.thelinuxreview.com/howto/intro_to_networking/c5381.htm on Feb. 5, 2002, 4 pgs.

(Continued)

*Primary Examiner*—Aung S. Moe
*Assistant Examiner*—Kerri M Rose
(74) *Attorney, Agent, or Firm*—Straub and Pokotylo; John C. Pokotylo

(57) ABSTRACT

A transport LAN segment service is provided over a transport network. The transport network will include edge devices configured to support one or more transparent LAN segments. Configuration is simplified by advertising TLS-port-label information, layer 2 address learning, and multicasting when the needed configuration information has not yet been learned or discovered.

37 Claims, 20 Drawing Sheets

OTHER PUBLICATIONS

"VLANs Reborn," *Business Communications Review* (Oct. 2000), downloaded from: http://www.burtongroup.com/promo/articles/bcr.10.2000.htm on Feb. 5, 2002, 4 pgs.

B. Gleeson, A. Lin, J. Heinanen, T. Finland, G. Armitage, A Malis, "A Framework for IP Based Virtual Private Networks," *RFC:2764* (Network Working Group, Internet Engineering Task Force; Feb. 2000), downloaded from: http://www.ietf.org/rfc/rfc2764.txt?number=2764 on Jun. 26, 2002, 55 pgs.

M. Mroz, O. Stokes, V. Kanagasabapathy, V. Bhagavath, G. Heron, P. Lin, Y. Serbest, "Tunnel LSPs Extended Across Autonomous System Boundaries," *Internet Draft Document* (Internet Engineering Task Force; Feb. 2002), downloaded from: http://search.ietf.org/internet-drafts/draft-mroz-ppvpn-inter-as-lsps-00.txt on Jun. 26, 2002, 16 pgs.

E. C. Rosen, "Singe-Sided Signaling for L2VPNs," Network Working Group, (Internet Engineering Task Force; Feb. 2002), downloaded from: http://search.ietf.org/internet-drafts/draft-rosen-ppvpn-l2-signaling-01.txt on Jun. 26, 2002, 14 pgs.

G. Heron, A. Hamilton, D. Tappan, E. C. Rosen, L. Martini, N. El-Aawar, T. Smith, A. G. Malis, "Encapsulation Methods for Transport of PPP/HDLC Frames Over IP and MPLS Networks," Network Working Group, (2001) (Internet Engineering Task Force; Apr. 2002), downloaded from: http://search.ietf.org/internet-drafts/draft-martini-ppp-hdlc-encap-mpls-00.txt on Jun. 26, 2002, 9 pgs.

V. Sirkay, G. Heron, C. Liljenstolpe, D. Tappan, E. C. Rosen, C. Kawa, A. G. Malis, L. Martini, N. El-Aawar, P. Pate, S. Vogelsang, D. S. Vlachos, K. Kompella, R. Bhat, N. Vasavada, "Frame Relay Encapsulation over Pseudo-Wires," PWE3 Working Group, (Internet Engineering Task Force; Jun. 2002), downloaded from: http://search.ietf.org/internet-drafts/draft-martini-frame-encap-mpls-01.txt on Jun. 26, 2002, 29 pgs.

S. Vogelsang, J. Shirron, T. Smith, V. Radoaca, A. G. Malis, V. Sirkay, D. Cooper, L. Martini, N. El-Aawar, D. Tappan, E. C. Rosen, A. Hamilton, J. Jayakumar, D. S. Vlachos, C. Liljenstolpe, G. Heron, K. Kompella, "Encapsulation Methods for Transport of Layer 2 Frames Over IP and MPLS Networks," Network Working Group, (Internet Engineering Task Force; Nov. 2001), downloaded from: http://search.ietf.org/internet-drafts/draft-martini-l2circuit-encap-mpls-04.txt on Jun. 26, 2002, 15 pgs.

G. Heron, C. Liljenstople, D. Tappan, E. C. Rosen, A. G. Malis, V. Sirkay, L. Martini, N. El-Aawar, S. Vogelsang, V. Radoaca, K. Kompella, "Encapsulation Methods for Transport of Ethernet Frames Over IP and MPLS Networks," Network Working Group, (Internet Engineering Task Force; Apr. 2002), downloaded from: http://search.ietf.org/internet-drafts/draft-martini-ethernet-encap-mpls-00.txt on Jun. 26, 2002, 9 pgs.

R. Wilder, D. S. Vlachos, T. Johnson, C. Liljenstolpe, J. Rutemiller, G. Heron, N. Harrison, L. Martini, N. El-Aawar, J. Brayley, G. de Grace, J. Shirron, A. G. Malis, J. Jayakumar, D. Chinnaiah, D. Tappan, E. Rosen, L. Dominik, K. Kompella, T. Walsh, "Encapsulation Methods for Transport of ATM Cells/Frame Over IP and MPLS Networks," PWE3 Working Group, (Internet Engineering Task Force; Jun. 2002), downloaded from: http://search.ietf.org/internet-drafts/draft-martini-atm-encap-mpls-01.txt on Jun. 26, 2002, 22 pgs.

S. Vogelsang, J. Shirron, T. Smith, V. Radoaca, A. G. Malis, V. Sirkay, D. Cooper, L. Martini, N. El-Aawar, D. Tappan, E. C. Rosen, A. Hamilton, J. Jayakumar, D. S. Vlachos, C. Liljenstolpe, G. Heron, K. Kompella, "Transport of Layer 2 Frames Over MPLS," Network Working Group, (Internet Engineering Task Force; Apr. 2002), downloaded from: http://search.ietf.org/internet-drafts/draft-martini-l2circuit-trans-mpls-09.txt on Jun. 26, 2002, 17 pgs.

L. Martini, N. El-Aawar, G. Heron, D. Tappan, E. C. Rosen, A. Hamilton, J. Jayakumar, S. Vogelsang, J. Shirron, T. Smith, A. G. Malis, V. Sirkay, D. S. Vlachos, K. Kompella, "Encapsulation Methods for Transport of Layer 2 Frames Over MPLS", (Network Working Group, Internet Engineering Task Force; Feb. 2001), downloaded from: http://www.watersprings.org/pub/id/draft-martini-l2circuit-encap-mpls-01.txt on Jul. 2, 2002, 15 pgs.

L. Martini, N. El-Aawar, G. Heron, D. Tappan, E. C. Rosen, A. Hamilton, J. Jayakumar, S. Vogelsang, J. Shirron, T. Smith, A. G. Malis, V. Sirkay, D. S. Vlachos, "Transport of Layer 2 Frames Over MPLS", (Network Working Group, Internet Engineering Task Force; Feb. 2001), downloaded from: http://www.watersprings.org/pub/id/draft-martini-l2circuit-trans-mpls-05.txt on Jul. 2, 2002, 13 pgs.

* cited by examiner

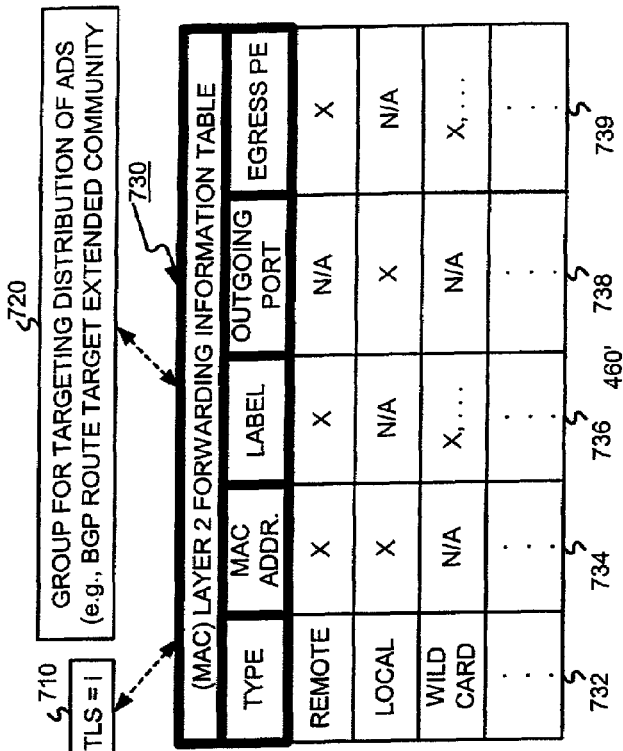
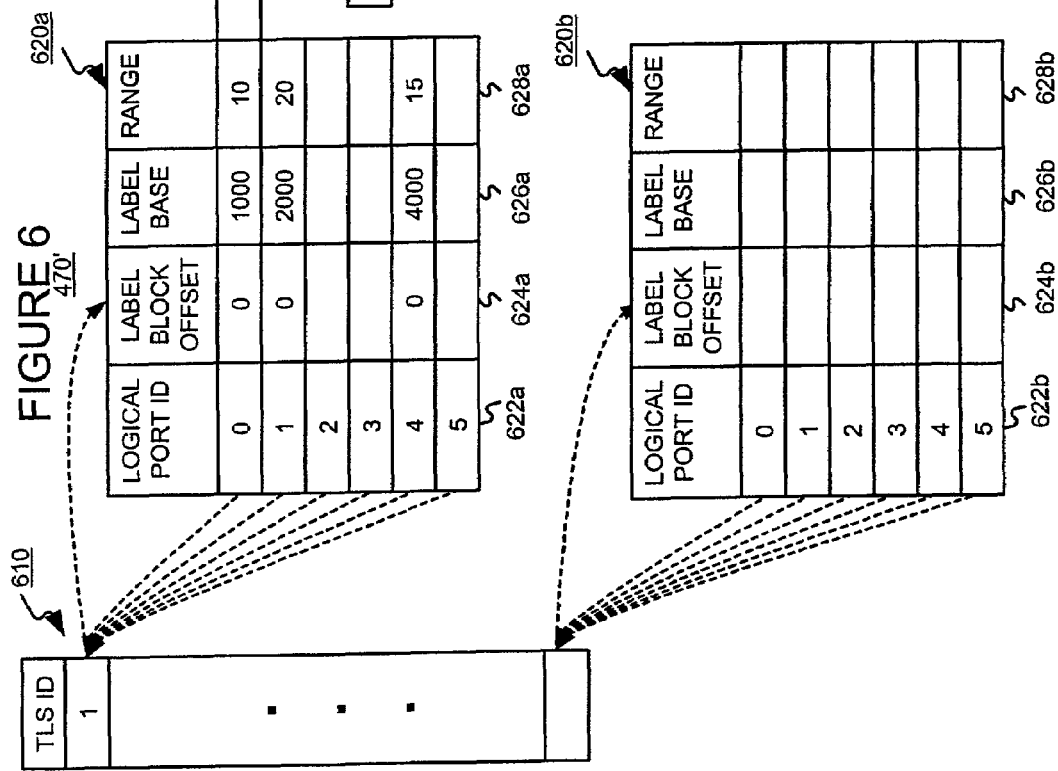

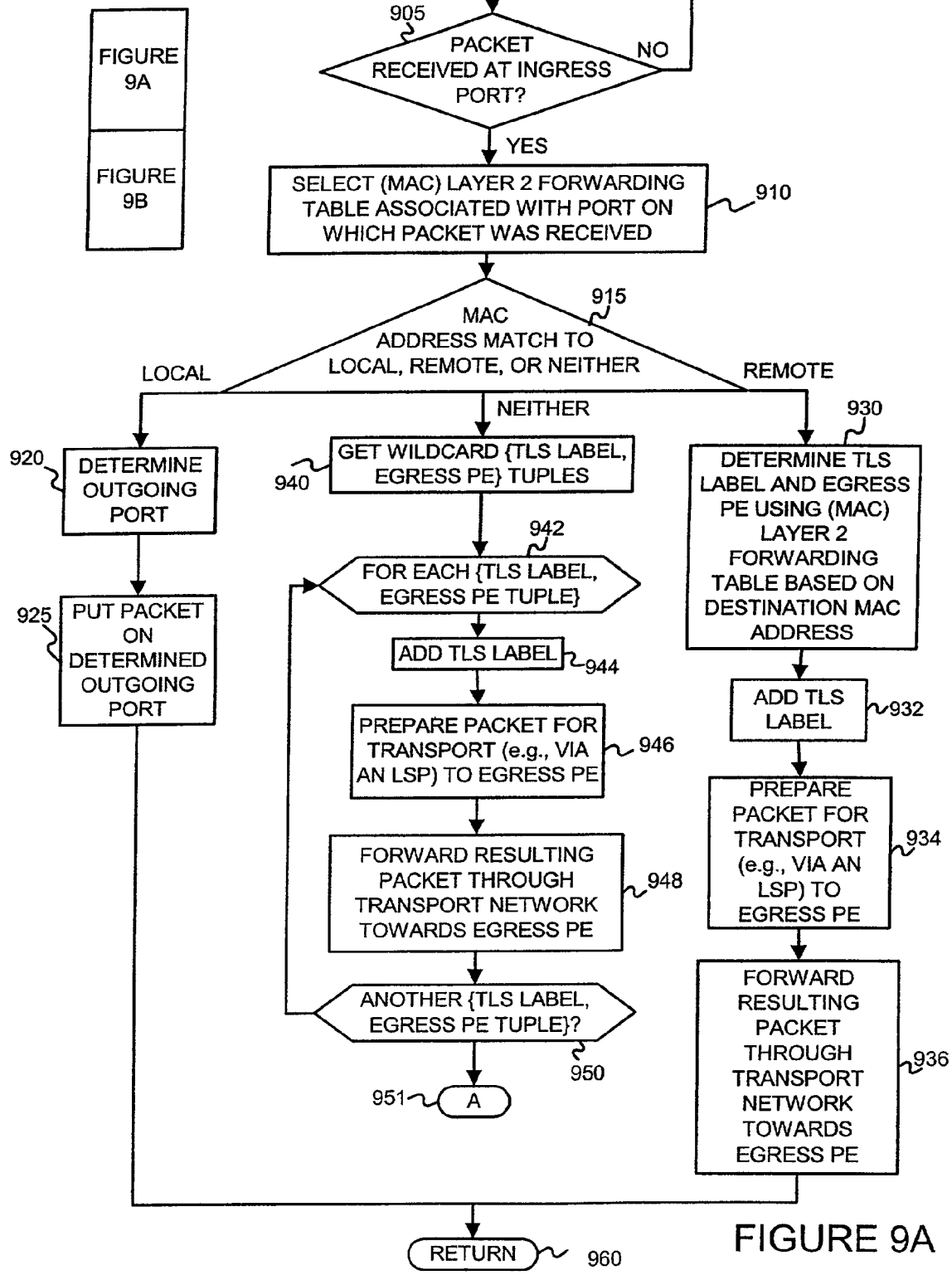

EDGE DEVICES FOR PROVIDING A TRANSPARENT LAN SEGMENT SERVICE AND CONFIGURING SUCH EDGE DEVICES

§ 0. RELATED APPLICATIONS

Benefit is claimed, under 35 U.S.C. § 119(e)(1), to the filing date of provisional patent application Ser. No. 60/325,344, entitled "SUPPORT OF TRANSPARENT LAN SEGMENT", filed on Sep. 26, 2001 and listing Yakov Rekhter as the inventor, for any inventions disclosed in the manner provided by 35 U.S.C. § 112, ¶1. That provisional application is expressly incorporated herein by reference.

§ 1. BACKGROUND OF THE INVENTION

§ 1.1 Field of the Invention

The present invention concerns methods, apparatus and data structures for providing a transport network that supports a virtual LAN service. More specifically, the present invention concerns emulating a transparent LAN segment to support a virtual LAN. The present invention also concerns configuring such a network.

§ 1.2 Related Art

The description of art in this section is not, and should not be interpreted to be, an admission that such art is prior art to the present invention.

§ 1.2.1 Known Private Networking Technologies

For many entities (such as businesses, universities, etc.), local area networks (or "LANs") suffice for intra-entity communications. Indeed, LANs are quite popular since they are relatively inexpensive to deploy, operate, and manage, and are based on mature, well-developed technology, such as Ethernet, for example. Unfortunately, however, most entities need to communicate (voice and/or data) with their own facilities, or others, beyond their immediate location. Thus, wide area networks (or "WANs") are needed. Very often, entities want at least some privacy or security attached to their communications.

Presently, private long-haul communications can take place over networks that can be generally classified into two types—dedicated WANs that facilitate communications among multiple sites, and public transport networks that allow one or more sites of a private network to communicate. Both of these types of networks are introduced below.

§ 1.2.1.1 Dedicated WANs

Dedicated wide area networks ("WANs") are typically implemented using leased lines or dedicated circuits to connect multiple sites. Customer premise equipment ("CPE") routers or switches at these sites connect these leased lines or dedicated circuits together to facilitate connectivity between each site of the network. Most private networks with a relatively large number of sites will not have "fully meshed" networks (i.e., direct connections between each of the sites) due to the cost of leased lines or dedicated circuits and to the complexity of configuring and managing customer premises equipment. Rather, some form of hierarchical network topology is typically employed in such instances. Dedicated WANs are relatively expensive and typically require the customer to have some networking expertise.

§ 1.2.1.2 Virtual Private Networks

Public transport networks, which are typically deployed by regional bell operating companies (or "RBOCs"), or some other service provider, are often used to allow remote users to connect to an enterprise network using the public-switched telephone network (or "PSTN"), an integrated services digital network (or "ISDN"), or some other type of transport network technology. (Note that the word "public" in the phrase "public transport network" connotes the fact that more than one entity may use it, even though it may be privately owned and managed, and not available to the general public.) Such remote access may be facilitated by deploying network access servers (or "NASs") at one or more central cites. When users connect to (e.g., dial into) a NAS, it works with authentication, authorization and accounting (or "AAA") servers to verify the identity of the user and to check which services that user is authorized to use.

§ 1.2.2 Limitations of Known Transport Network Technologies

As can be appreciated, private dedicated WANs are beyond the financial reach of many entities. Accordingly, so-called public transport networks have become quite popular. Unfortunately, however, various incompatible public transport networks have been introduced over the years in response to the then perceived needs to support various applications. Examples of such public transport network technologies include switched multimegabit data service ("SMDS"), X.25 packet switched networks, frame relay, broadband ISDN, and asynchronous transport mode ("ATM").

The fact that public transport networks use incompatible technologies has two onerous implications for service providers. First, technologies with which customers access the transport network (referred to as "access technologies") must be compatible with the technology used in the transport network (unless there is a handoff between networks, which is expensive). Thus, customers are locked into a technology from end-to-end. Further, such dependencies between access technologies and transport network technologies have forced public transport network service providers to support, maintain and administer separate networks.

Thus, an alternative public transport network is needed. Such a public transport network should (i) support the provision of virtual private network functions, (ii) isolate the transport network from incompetent or malicious actions by customers, (iii) be easy for a service provider to deploy (provision and configure) and manage, and/or (iv) allow customers to use a mature technology that is easy to install, use and manage, such as Ethernet for example, while shielding them from the complexities of the transport network.

§ 2 SUMMARY OF THE INVENTION

The present invention may be use to (i) provide data transport that can act as a transparent LAN segment, (ii) facilitate the provisioning one or more such a transparent LAN segments, and (iii) facilitate the configuration of the transport network, including the service provider edge devices, to support a provisioned transparent LAN segment service.

As a packet destined for a particular device (as defined by a layer 2, e.g., MAC, destination address) is forwarded from a source device on a first LAN to a destination device on a second LAN, where both the first and second LANs are coupled via a transparent LAN segment, it may traverse a path having three basic parts; namely, (i) from the first LAN to an associated ingress service provider edge device, (ii) from that ingress service provider edge device to an egress service provider edge device associated with the second LAN having the destination device, and (iii) from that egress service provider edge device to the second LAN. The second part of the path—from the ingress service provider edge device to the egress service provider edge device—may exploit known label switched path forwarding techniques.

Using the present invention, an ingress PE router R1 can cause a packet to be delivered to the egress PE router R2 by pushing some label onto the packet and sending the result to one of its adjacencies. This label is referred to as the "tunnel label", and the corresponding label switched path is referred to as the "tunnel LSP". Such tunnel LSPs could be established via known protocols such as BGP, LDP, RSVP, for example. The tunnel LSP merely gets packets from the ingress PE router R1 to the egress PE router R2—the corresponding tunnel label doesn't tell the egress PE router R2 what to do with the payload. In fact, if penultimate hop popping is used, the egress PE router R2 may never even see the corresponding tunnel label. (If the ingress PE router R1 itself is the penultimate hop, a tunnel label may not even get pushed on.) The present invention may be used to provide an additional label, which is made available to the egress PE router R2 (it may be encapsulated by the tunnel label so that it is preserved), and which is used by the egress PE router R2 to determine how to treat the received packet. This label is referred to as the "TLS label".

At the edge of the transport network, each service provider edge device may have one or more ports that the service provider uses to couple a customer's LAN to the service provider's transport network. A given (logical) port on a service provider edge device PE could be used to connect to only one virtual TLS. Thus a given (logical) port belongs to one TLS. However, if VLANs are to be supported, a logical port may be associated with a particular VLAN, and a physical port should be able to support multiple VLANs and hence, multiple logical ports.

The present invention may also be used to configure transparent LAN segments (TLSs) on a transport network by (i) providing layer 2 (MAC) forwarding information regarding the TLS to service provider edge devices (PEs) (preferably servicing at least one port of the TLS), and (ii) learning which devices (e.g., as identified by a layer 2, (e.g., MAC) address) belong to a TLS and where such devices are coupled with the TLS.

To avoid the need to make global changes (i.e., to all PEs) to configuration information each time a port is added to a TLS, the present invention may permit the service provider to configure ports locally (i.e., at the given edge device PE having the added port). The present invention may do so by providing (e.g., signaling), to all other service provider edge devices (PEs) that support the TLS, an identifier of the service provider edge device, an identifier of the TLS, a port identifier and label information used by the port. The label information may include a label offset (if any), a label base, and a label range. Service provider edge devices (PEs) receiving such signaling may then update a layer 2 (MAC) forwarding information table (an/or TLS information) related to the TLS. The service provider edge device (PE) may also update the layer 2 (MAC) forwarding information table related to the TLS based on packets received either locally, or from another (remote) service provider edge device (PE). If a forwarding entry for a particular layer 2 (MAC) destination address is not yet provided, instances of a packet destined to that layer 2 (MAC) address may be forwarded to any and all PEs having at least one port belonging to the relevant TLS. That is, multicasting packets based on "wild card" entries may be used as an interim solution until forwarding information for the layer 2 (MAC) destination device is learned/discovered.

§ 3. BRIEF DESCRIPTION OF THE DRAWINGS

FIG. 6 is a block diagram illustrating an association of transparent LAN segments to ports, as well as an association of ports to labels.

FIG. 7 is a block diagram illustrating an exemplary layer 2 (MAC) forwarding information table and associated information.

Figure 9B:
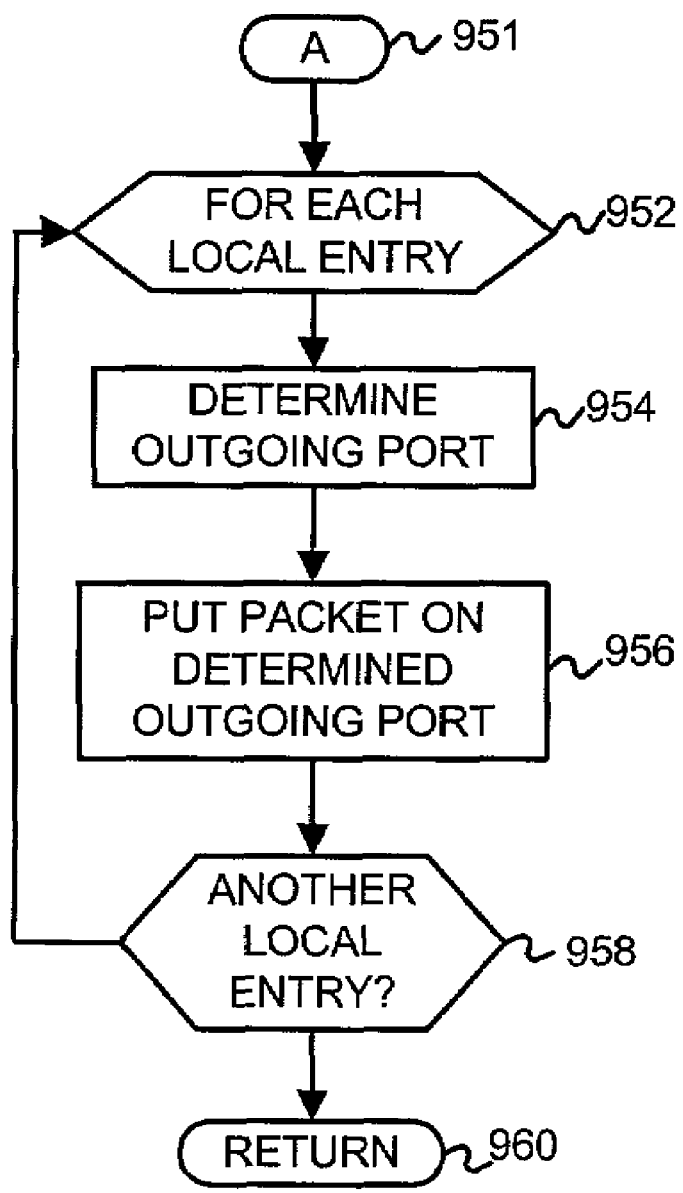
FIG. 9 illustrates the arrangement of drawing sheets including

FIGS. 9A and 9B which collectively illustrate a flow diagram of an exemplary method that may be used to effect ingress service provider edge device forwarding operations.

Figure 10:
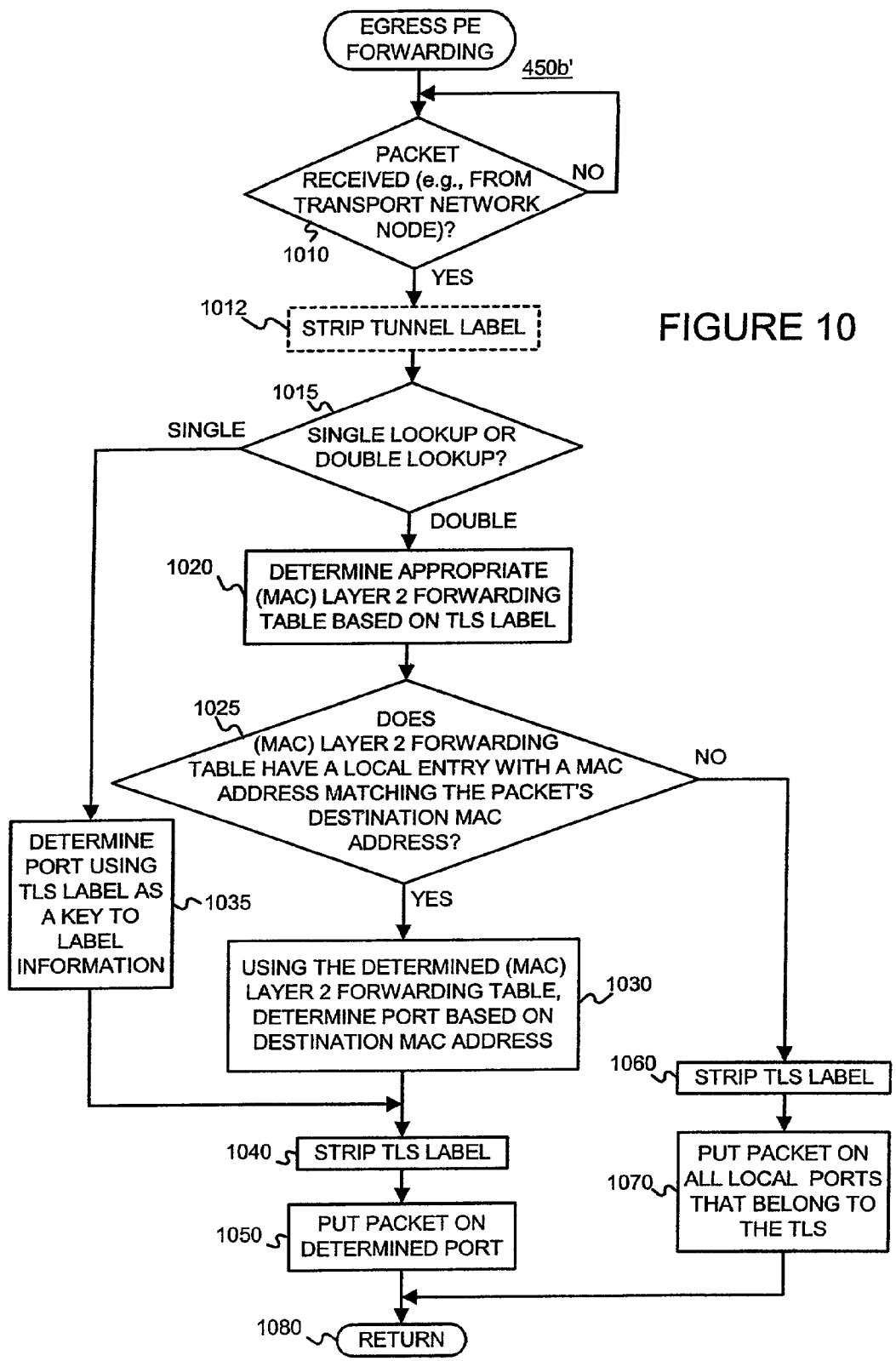

FIG. 10 is a flow diagram of an exemplary method that may be used to effect egress service provider edge device forwarding operations.

Figure 11:
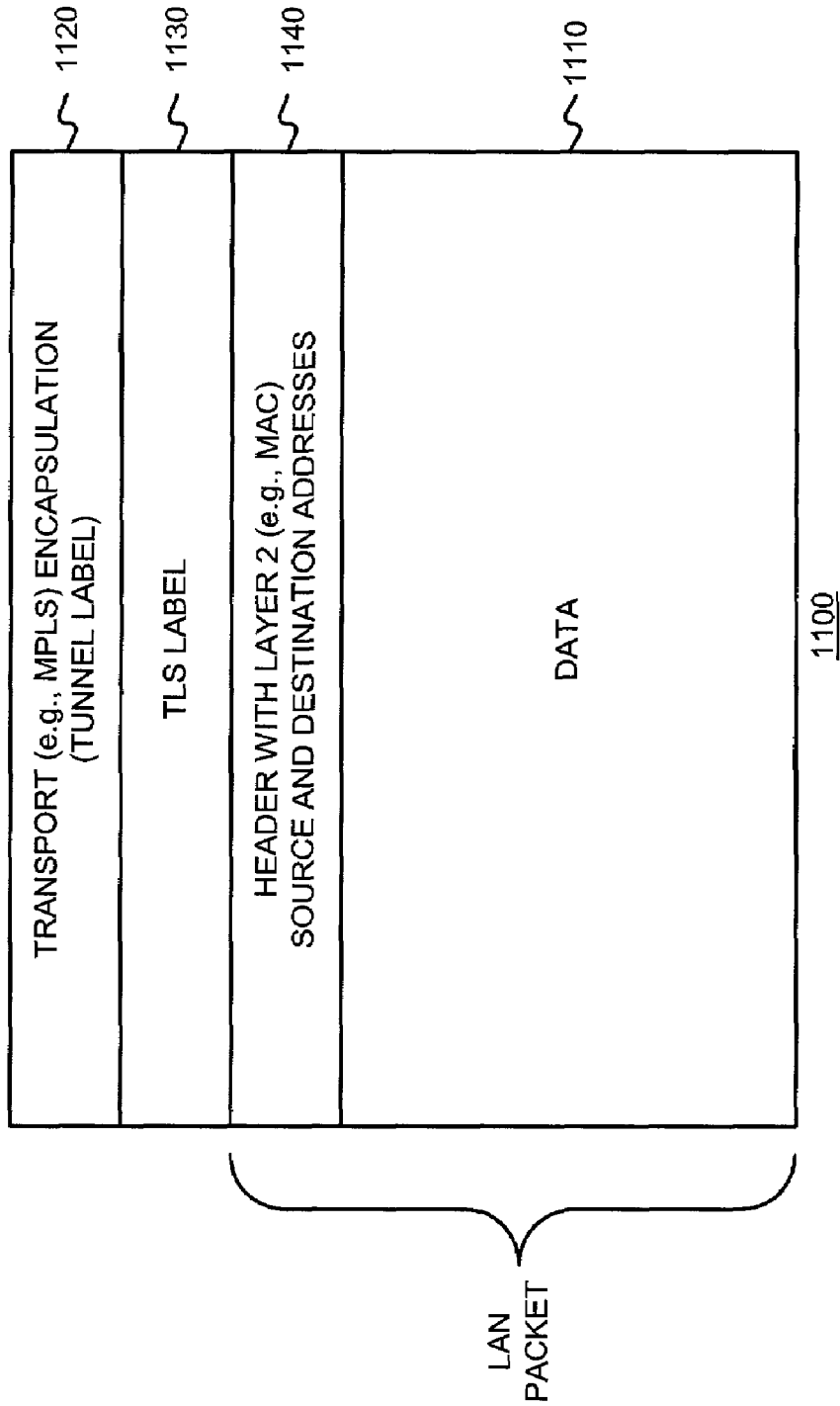

FIG. 11 is a block diagram illustrating a packet, such as an Ethernet packet, provided with a transparent LAN segment label and transport information.

Figure 12A:
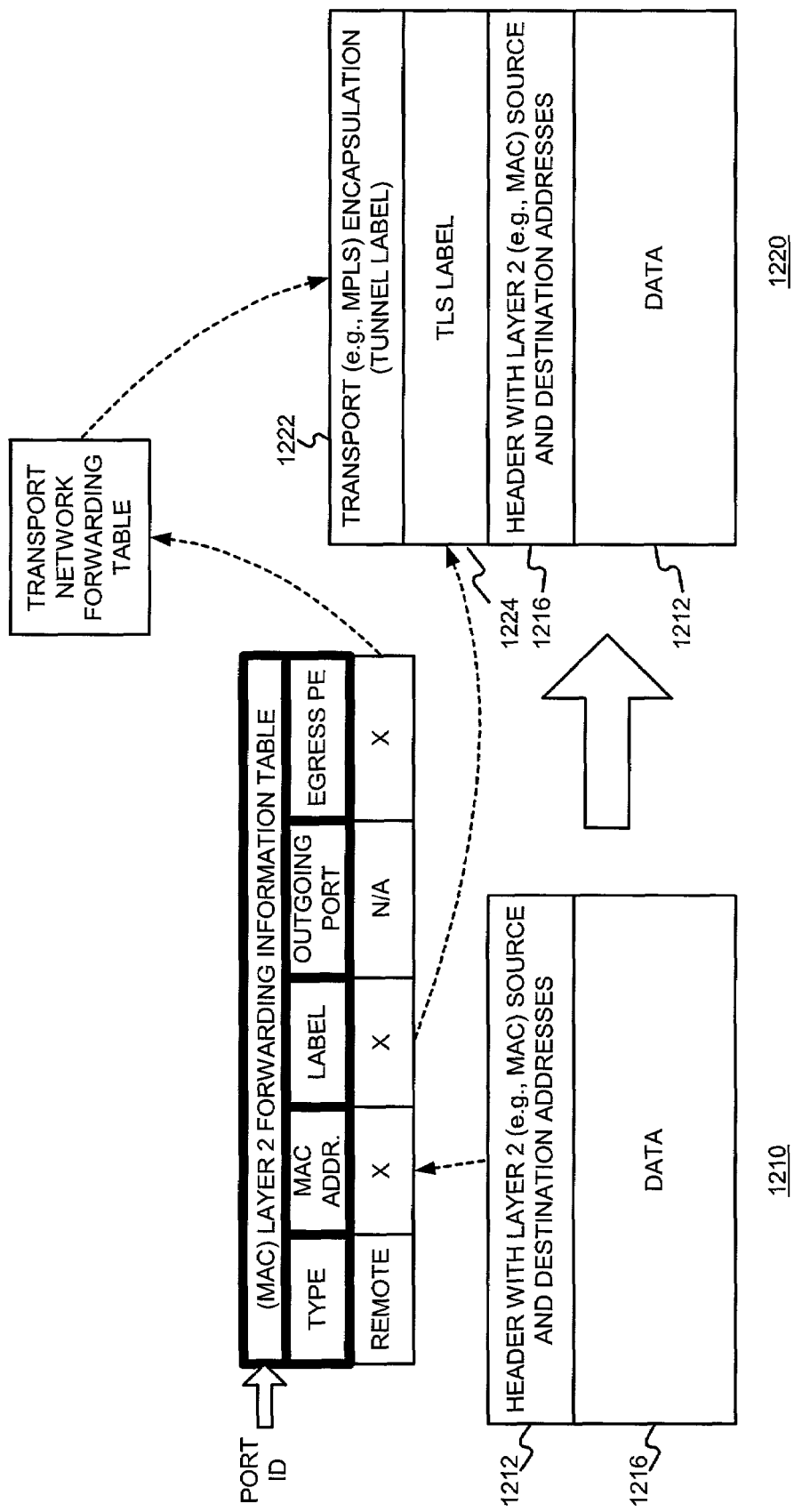
Figure 12B:
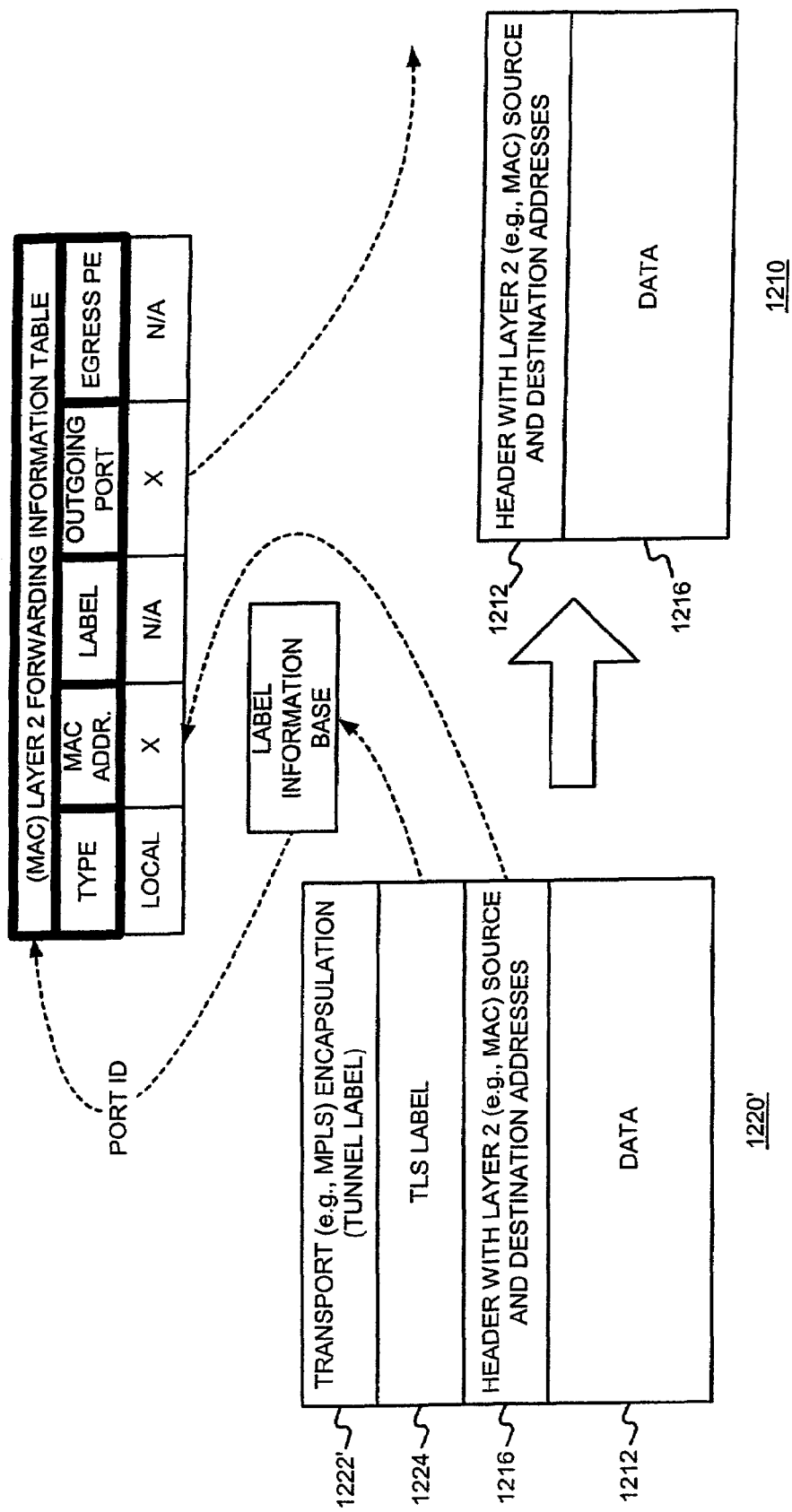
Figure 12C:
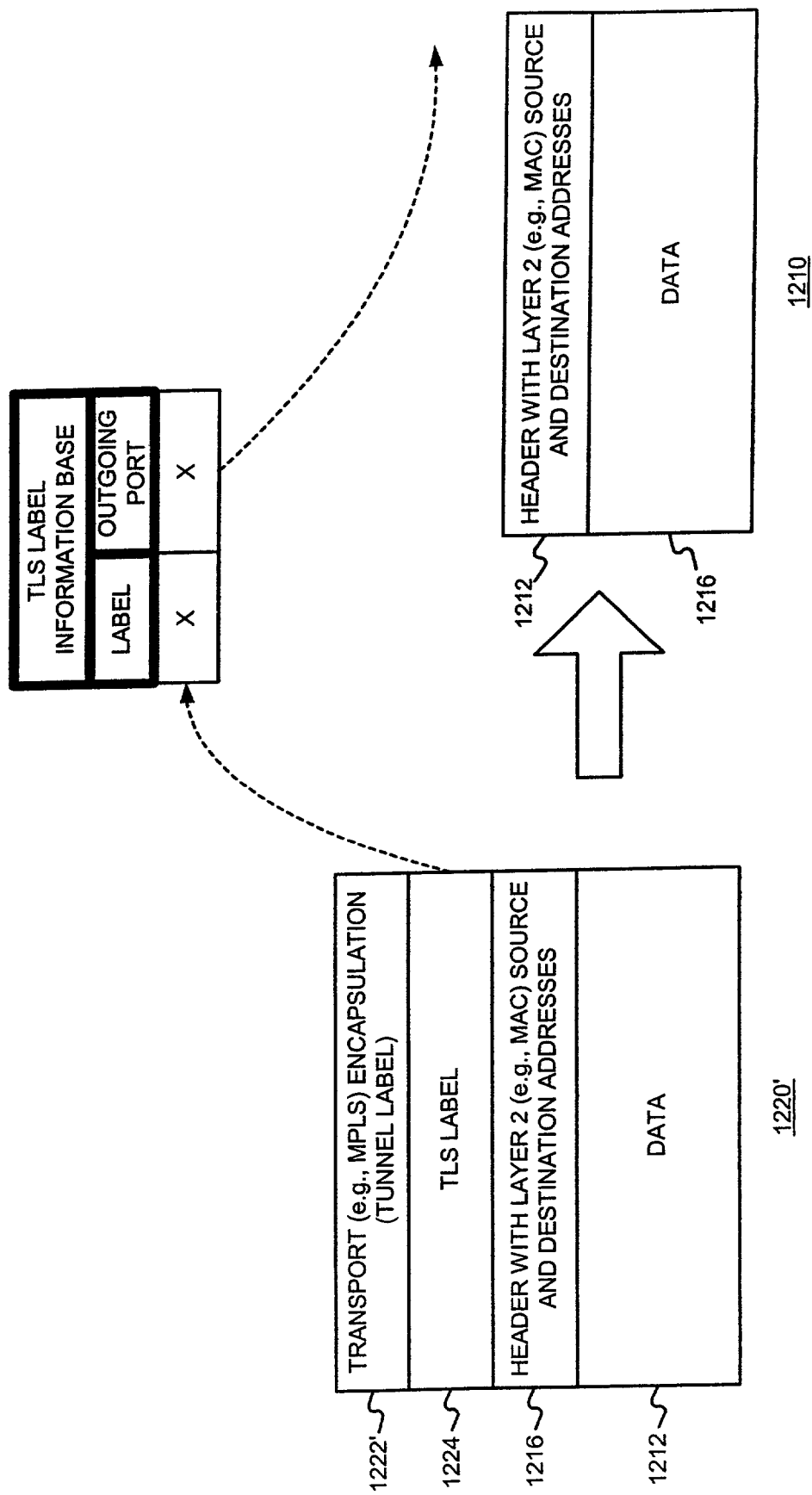

FIG. 12A illustrates an example of processing data at an ingress service provider edge device, and FIGS. 12B and 12C illustrate examples of processing data at an egress service provider edge device in exemplary embodiments of the present invention.

Figure 13:
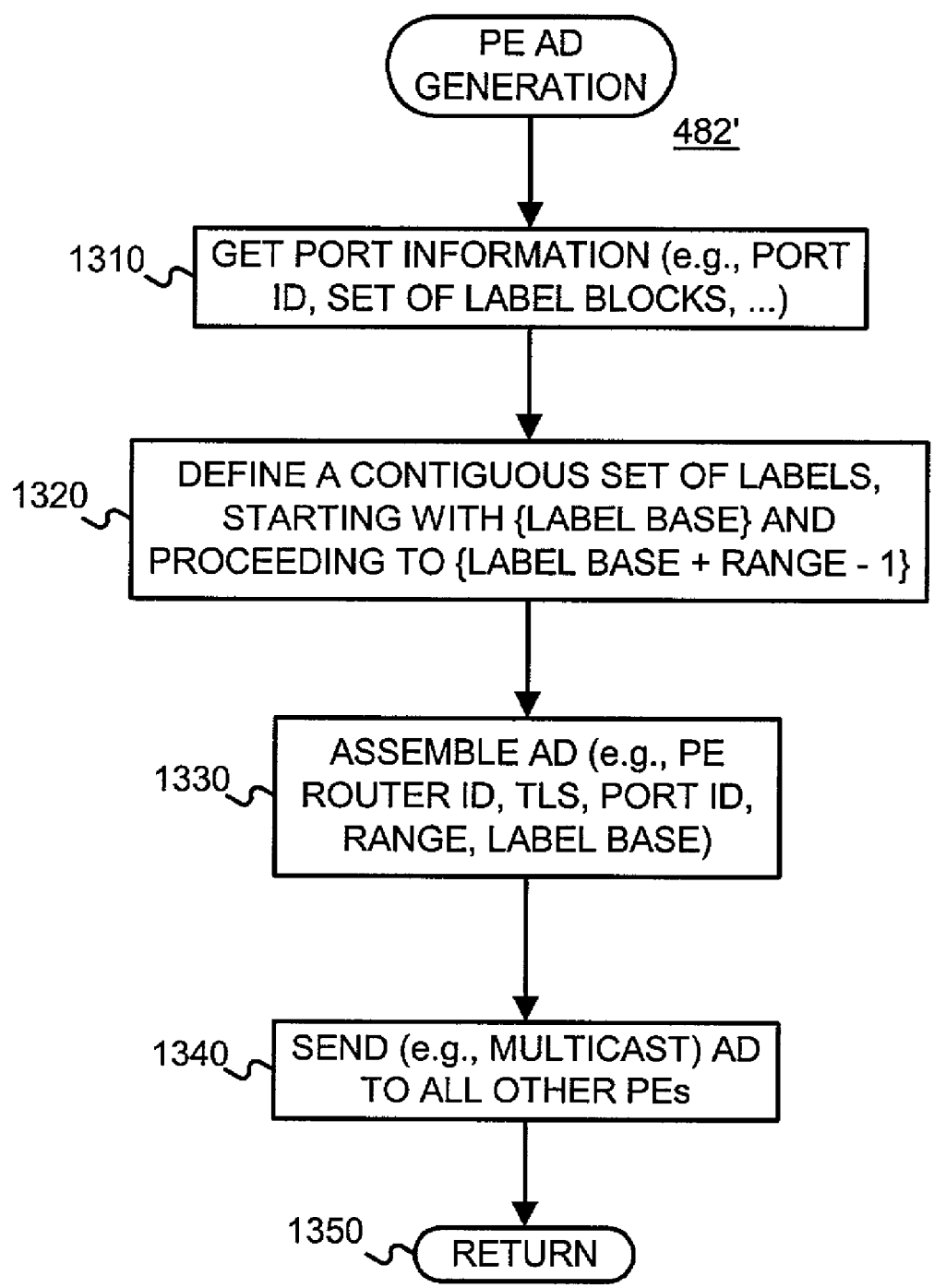

FIG. 13 is a flow diagram of an exemplary method that may be used to effect service provider edge device advertisement generation operations.

Figure 14:
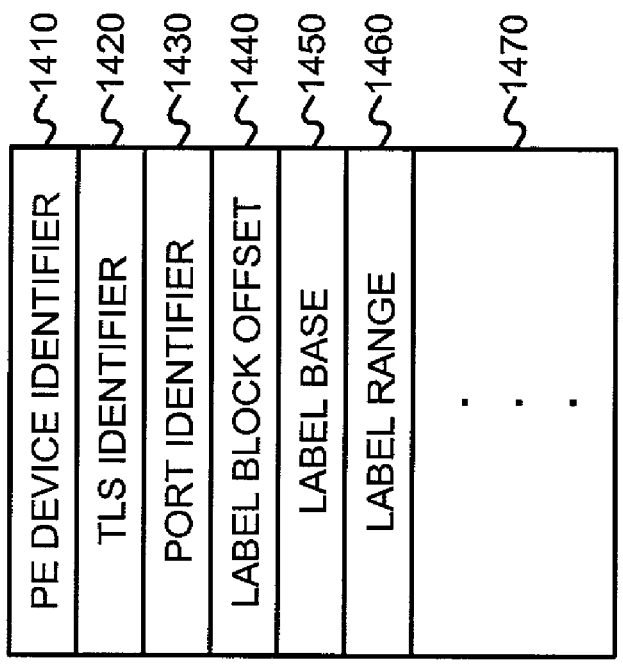

FIG. 14 is a block diagram of an exemplary advertisement that may be used in the context of the present invention.

Figure 15:
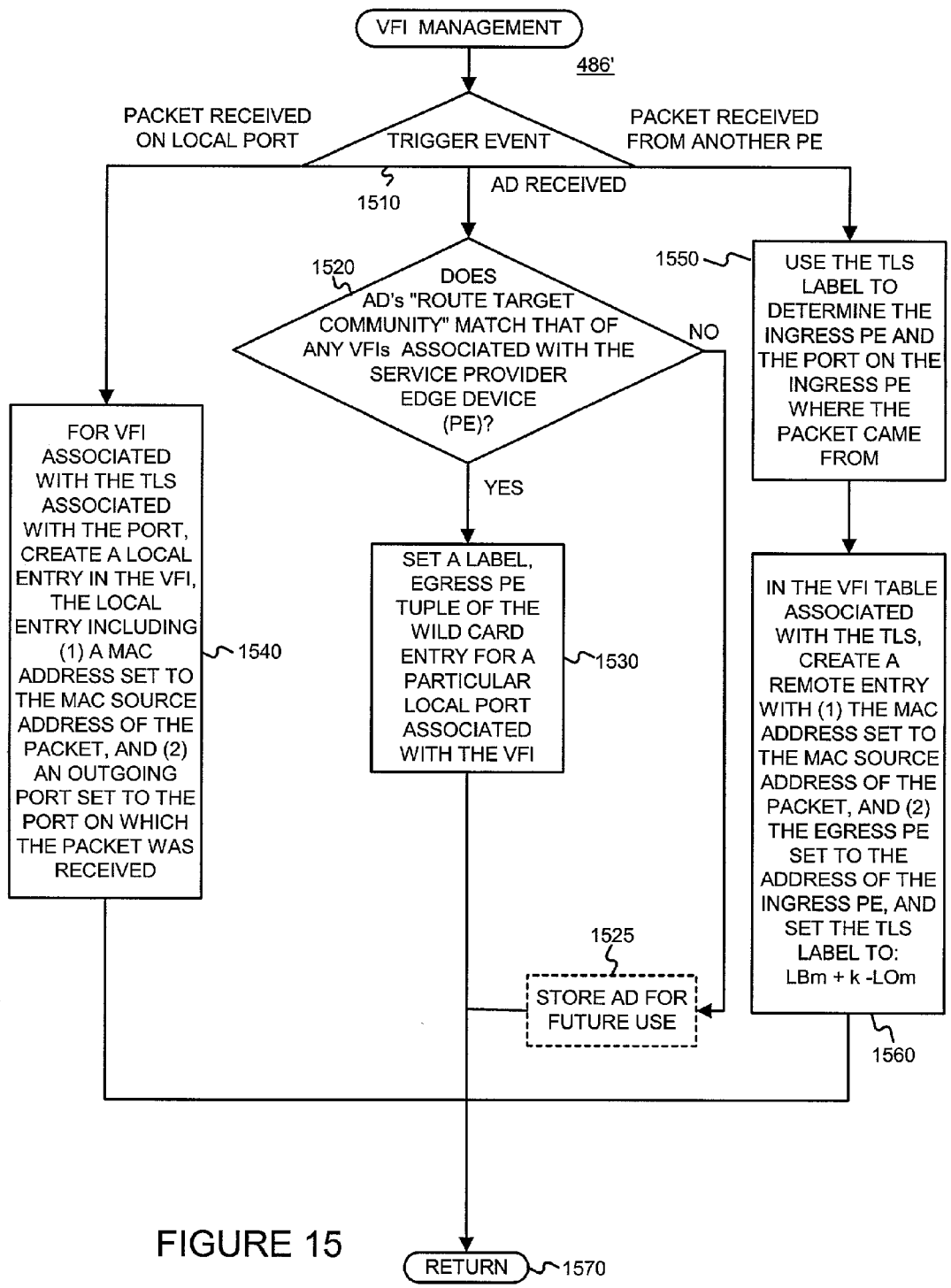

FIG. 15 is a flow diagram of an exemplary method that may be used to effect layer 2 (e.g., MAC) forwarding information table management operations.

Figure 16:
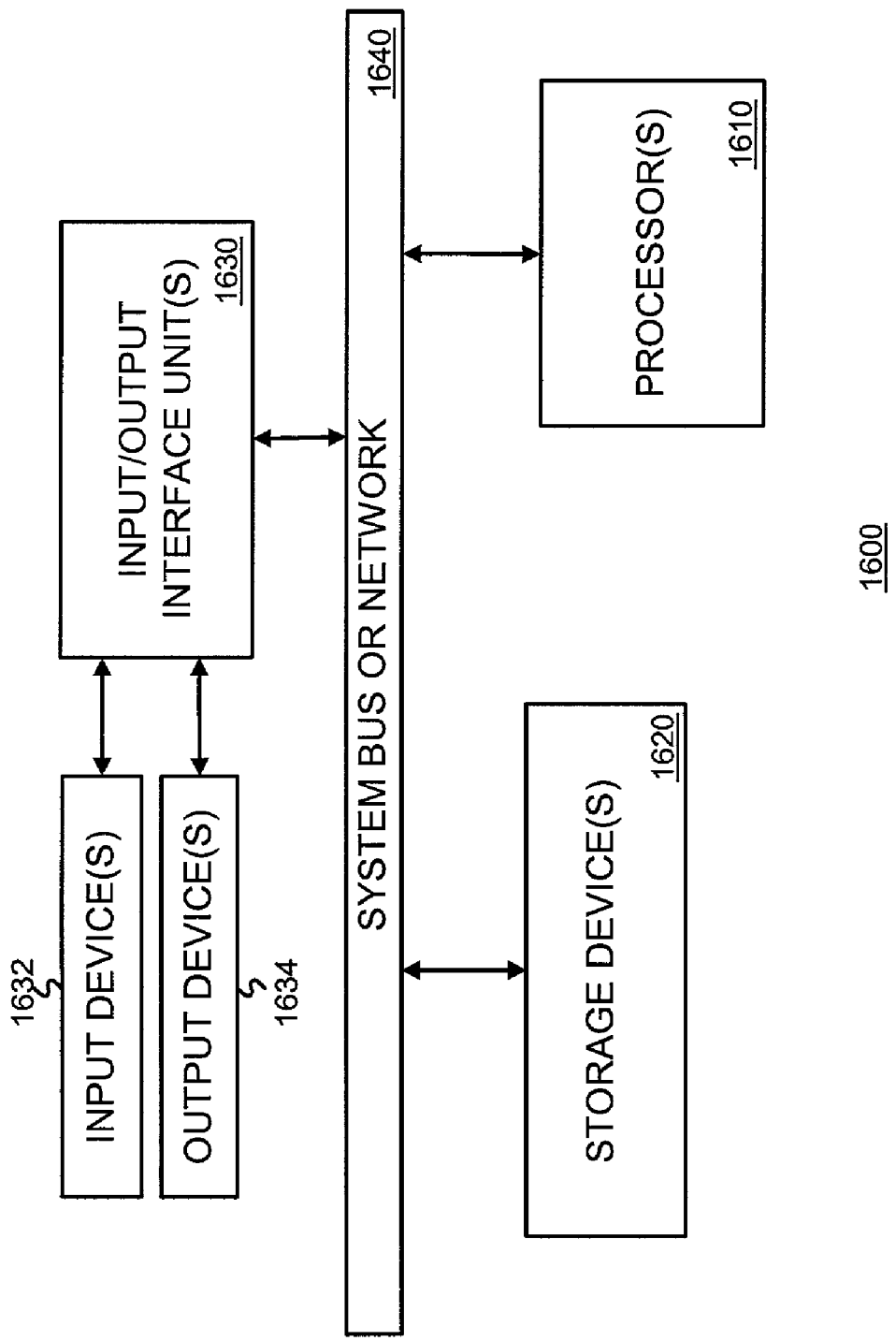

FIG. 16 is a block diagram of an apparatus that may be used to effect operations of the present invention, and to store information used and/or generated by the present invention.

Figure 17:
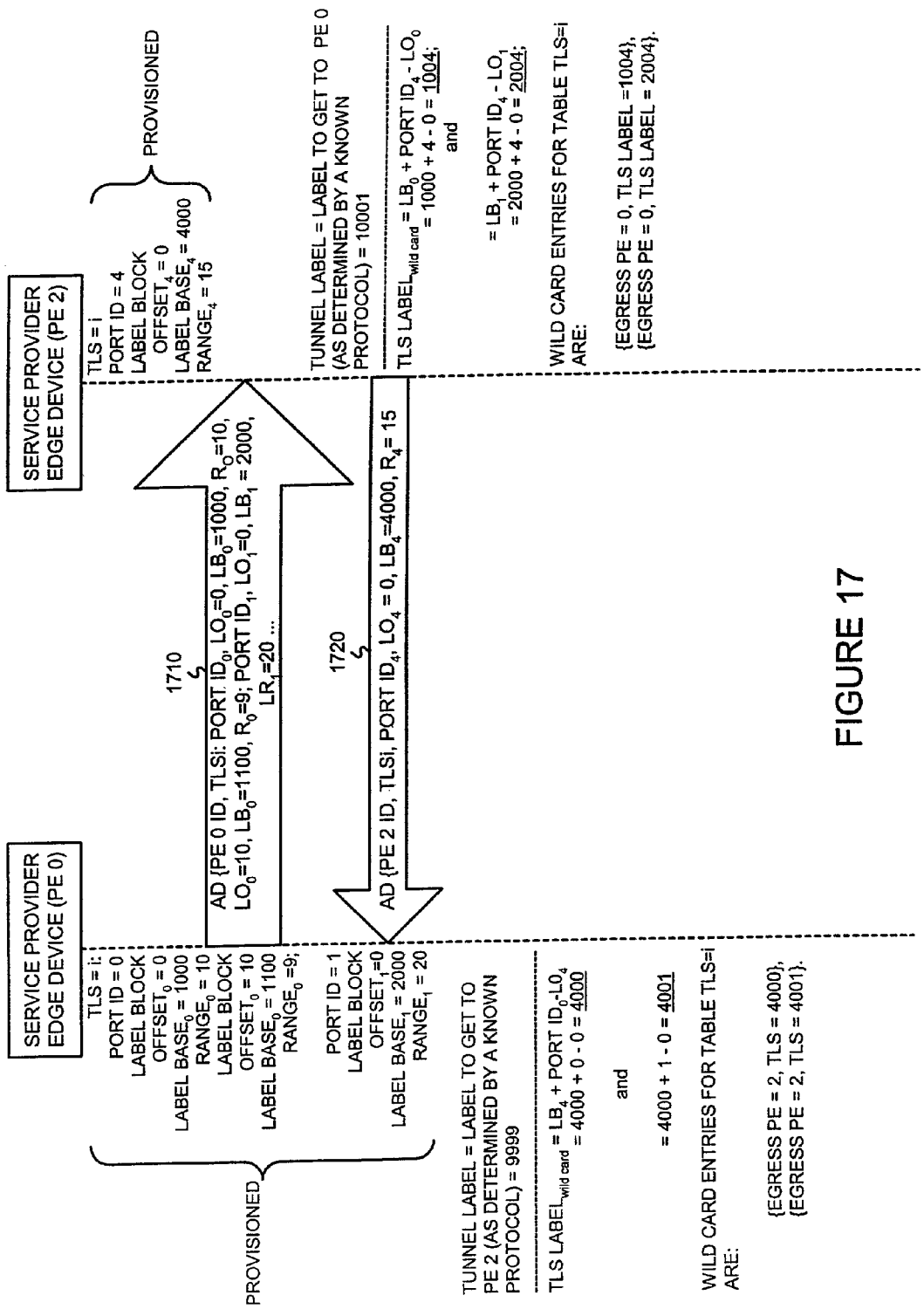

FIG. 17 is a messaging diagram illustrating exemplary advertisement operations and layer 2 (MAC) forwarding table update operations in an exemplary embodiment of the present invention.

Figure 18:
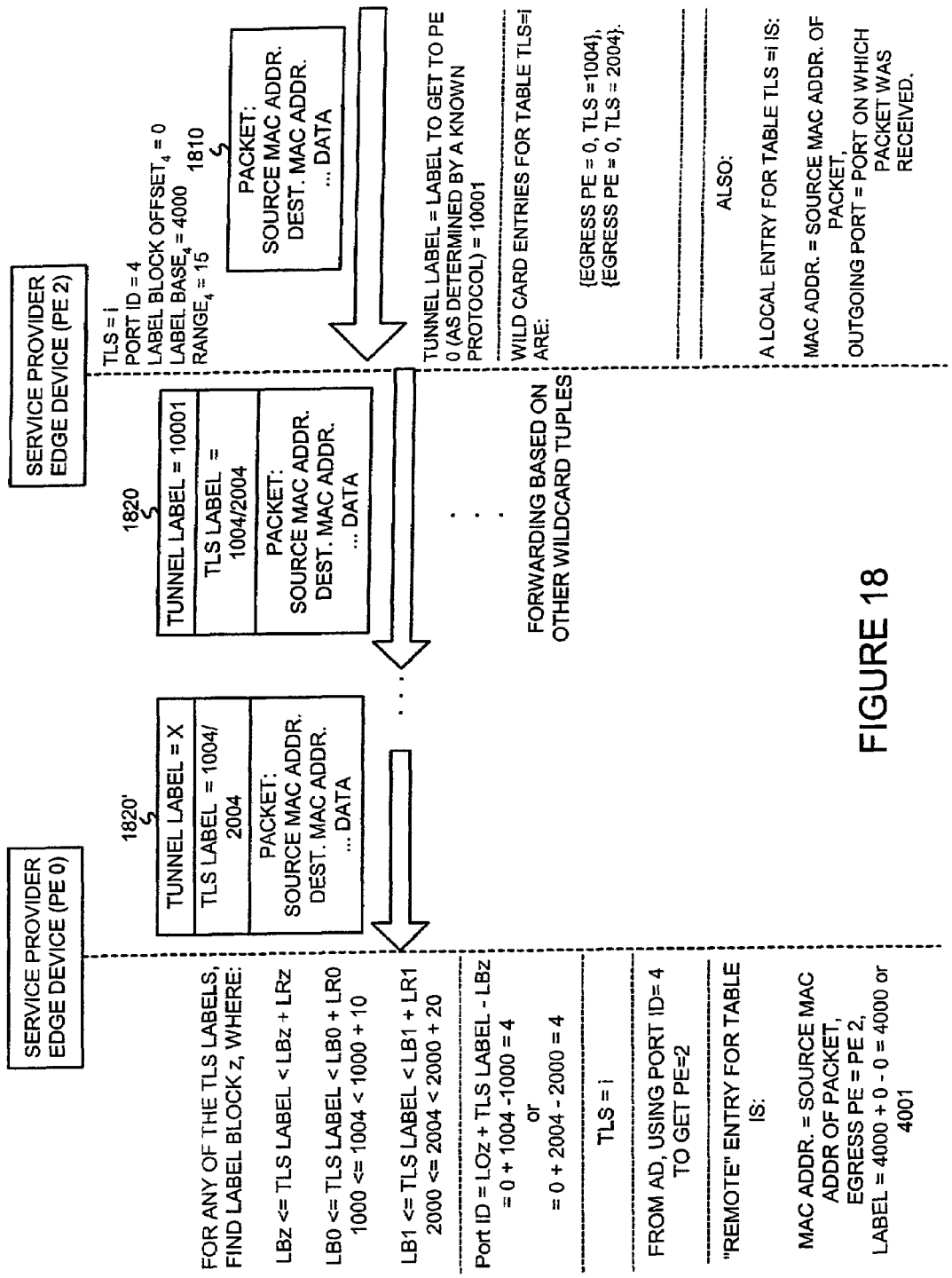

FIG. 18 is a messaging diagram illustrating exemplary remote and local entry update operations in an exemplary embodiment of the present invention.

§ 4. DETAILED DESCRIPTION

The present invention involves novel methods, apparatus and data structures for providing a transport network that can act as a transparent LAN segment, as well as methods, apparatus and data structures for provisioning and configuring such a transport network. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, an exemplary environment in which the invention may operate is described in § 4.1. Then, high-level applications that may be performed by the present invention are introduced in § 4.2. Thereafter, an exemplary service provider edge device (PE) that may be used to effect various aspects of the present invention is introduced in § 4.3. Then, exemplary methods and data structures that may be effected by and stored by, respectively, a service provider edge device are described in § 4.4. Thereafter, examples of network configuration and packet forwarding, are provided in § 4.5. Finally, some conclusions regarding various aspects of the present invention are provided in § 4.6.

§ 4.1 EXEMPLARY ENVIRONMENT IN WHICH THE PRESENT INVENTION MAY OPERATE

Figure 1:
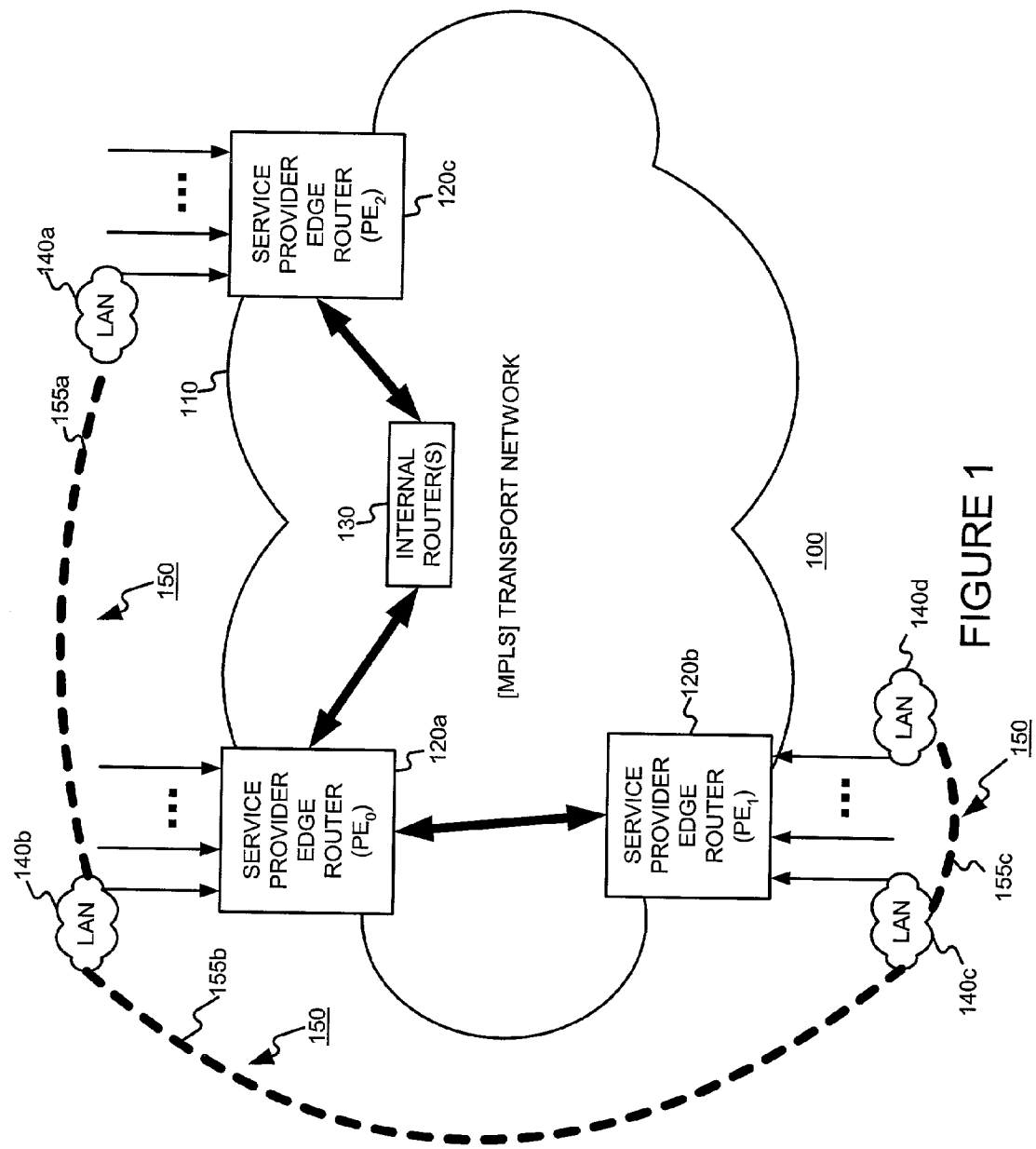
FIG. 1 illustrates an environment in which the present invention may be used.

FIG. 1 illustrates an exemplary environment 100 in which the present invention may operate. A service provider may operate a transport network 110 to provide a transparent LAN segment service for use by a customer having multiple LANs 140 at multiple sites. Each of the LANs 140 may have a one or more host devices (not shown), and may be coupled with the transport network 110 via a customer edge ("CE") device (not shown). The customer edge device may, in turn, be coupled with a service provider edge ("PE") device 120, such as a router for example. Internal nodes 130, such as routers, may be used to permit communications between various service provider edge devices 120 of the transport network 110. In this environment 100, a virtual LAN 150 may include LANs 140a-d, as well as transparent LAN segments 155a-c. The transparent LAN segments 155a-c can be thought of as coupling or bridging geographically remote LANs 140a-d.

Figure 2:
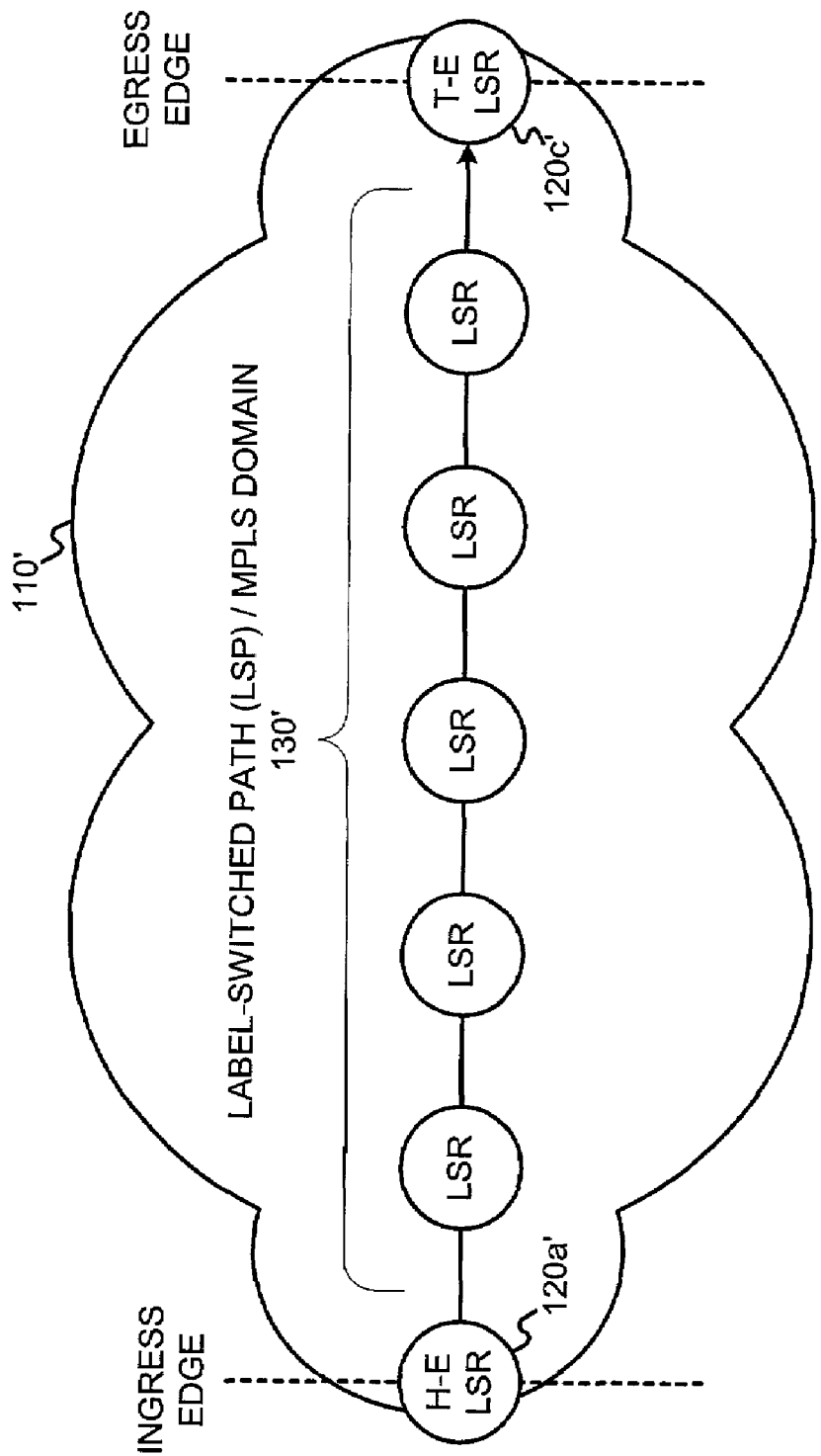
FIG. 2 illustrates a label-switched path.

In one exemplary embodiment, the transport network 110 may be a label-switching network, such as a multi-protocol label switching ("MPLS") network. FIG. 2 illustrates a label switched path 130' across a network 110'. Notice that label switched paths 130' may be simplex—traffic flows in one direction from a head-end label switching router (or "LSR") 120a' at an ingress edge to a tail-end label switching router 120c' at an egress edge. Duplex traffic typically requires two label switched paths—one for each direction. Notice that a label switched path 130' is defined by the concatenation of one or more label-switched hops, allowing a packet to be forwarded from one label switching router (LSR) to another across the MPLS domain 130'.

As is known, a label may be a short, fixed-length value carried in the packet's header to identify a forwarding equivalence class (or "FEC"). An FEC is a set of packets that are forwarded over the same path through a network even if their ultimate destinations are different. Alternatively, labels needn't be explicitly defined in a packet's header. Labels may be inferred. For example, in Generalized MPLS, a label could be a time slot (e.g., in SONET/SDH cross-connects), or even a port number (e.g., in Optical Cross-Connects).

Figure 3:
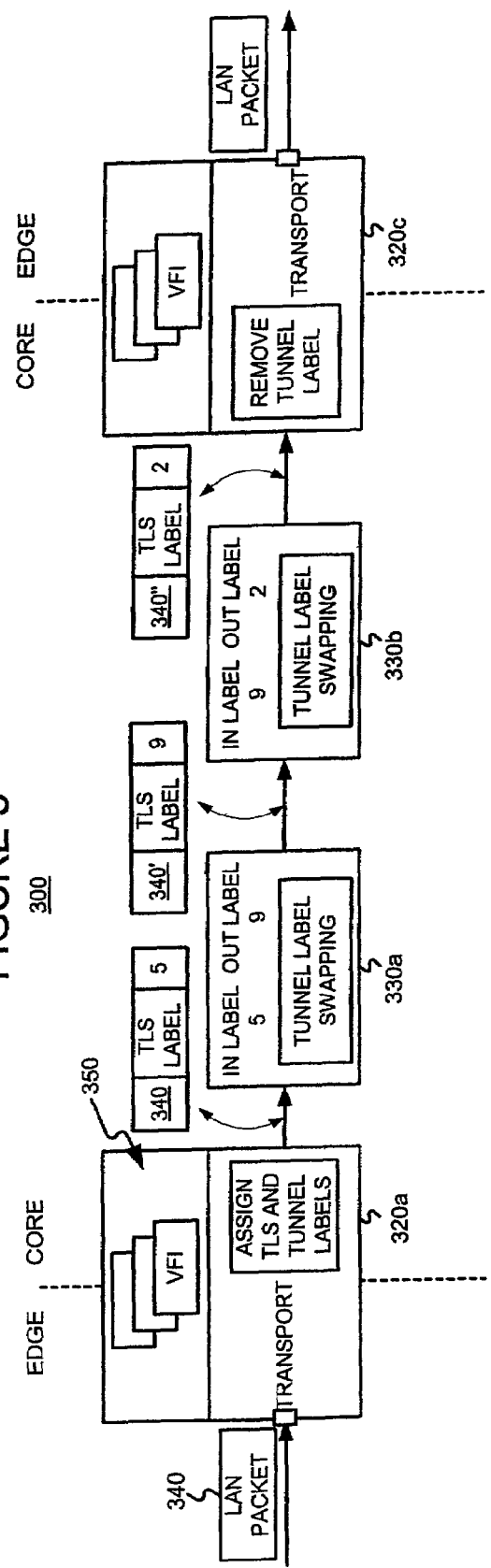
FIG. 3 illustrates the operation of a label-switched path.

FIG. 3 illustrates the operation of a label-switched path. The present invention may use labels as "tunnel labels" to transport data from an ingress service provider edge device to an egress service provider edge device. In such a case, at the ingress edge of the network, the router 320a may operate in accordance with the method 450a' described with reference to FIG. 9 to assign each packet an initial tunnel label (as well as a TLS label, described later). More specifically, referring to the example illustrated in FIG. 3, an ingress label switching router 320a determines a transparent LAN segment based on the port on which the unlabeled packet was received. (Note that if virtual LANs ("VLANs") are supported, a port may have multiple VLANs associated with it. In this case, a trans-parent LAN segment is determined based on a combination of the port on which the unlabeled packet was received and the VLAN-id carried in the packet.) Using a layer 2 (MAC) forwarding information table associated with the determined transparent LAN segment and ingress port, a destination (e.g., MAC) address 340 of the unlabeled packet is used to determine an inner (TLS) label and an egress edge device. An appropriate tunnel label is then determined based on the determined egress edge device. To reiterate, this tunnel label is used for forwarding the packet to the proper egress label switching router 320c (The TLS label is used for forwarding the packet from the egress label switching router 320c.).

In the MPLS domain, the label switching routers (LSRs) 330 simply forward the packet using label-swapping. More specifically, when a labeled packet arrives at a label switching router (LSR), the input port number and the tunnel label are used as lookup keys into an MPLS forwarding table. When a match is found, the forwarding component retrieves the associated outgoing label, the outgoing interface (or port), and the next hop address from the forwarding table. The incoming tunnel label is replaced with the outgoing tunnel label and the packet is directed to the outgoing interface for transmission to the next hop in the label switched path. FIG. 3 illustrates such label switching by label switching routers (LSRs) 330a and 330b.

When the labeled packet arrives at the egress label switching router 320c, the router may operate in accordance with the method 450b' described with reference to FIG. 10 to determine a port on which to place the packet based on the layer 2 (e.g., MAC) address of the packet and information in a layer 2 (MAC) forwarding information table selected based on the TLS label that was applied to the packet at the ingress router 320a.

The forgoing description of the packet forwarding using label switching presumed the existence of label switched paths and associated label entries in forwarding tables. These paths are determined and provided to each of the label switching routers (LSRs) in the label-switched path (LSP). Such path determination and distribution may be performed using known label distribution protocols such as label distribution protocol ("LDP"), resource reservation protocol ("RSVP") and border gateway protocol ("BGP").

§ 4.2 HIGH-LEVEL APPLICATIONS THAT MAY BE PERFORMED BY THE INVENTION

As described below, a high-level application of the present invention may be to provide data transport that can act as a transparent LAN segment. This application is further described in § 4.2.1 below. Another high-level application of the present invention may be to facilitate the provisioning one or more such a transparent LAN segments. This application is further described in § 4.2.2 below. Yet another high-level application of the present invention may be to facilitate the configuration of the transport network, including the service provider edge devices, to support a provisioned transparent LAN segment service. This application is further described in § 4.2.3 below.

§ 4.2.1. Data (Packet) Transport

As a packet destined for a particular device (as defined by a layer 2, e.g., MAC, destination address) is forwarded from a source device on a first LAN to a destination device on a second LAN, where both the first and second LANs are coupled via a transparent LAN segment, it traverses a path having three basic parts; namely, (i) from the first LAN to an associated ingress service provider edge device, (ii) from that ingress service provider edge device to an egress service provider edge device associated with the second LAN having the destination device, and (iii) from that egress service provider edge device to the second LAN. Exemplary methods and data structures for effecting the first and third parts of the path are described in more detail in § 4.4.2 below, with reference to FIGS. 7, 9 and 10. The second part of the path—from the ingress service provider edge device to the egress service provider edge device—may exploit known label switched path forwarding techniques, as described below in terms of inter-PE connectivity.

Assume it is desired to transport an Ethernet packet from ingress PE router (R1) to egress PE router (R2), across an intervening MPLS network (Assume that there is a label switched path from R1 to R2.). That is, the ingress PE router R1 can cause a packet to be delivered to the egress PE router R2 by pushing some label onto the packet and sending the result to one of its adjacencies. This label is referred to as the "tunnel label", and the corresponding label switched path is referred to as the "tunnel LSP". Such tunnel LSPs could be established via known protocols such as BGP, LDP, RSVP, for example. The tunnel LSP merely gets packets from the ingress PE router R1 to the egress PE router R2—the corresponding tunnel label doesn't tell the egress PE router R2 what to do with the payload. In fact, if penultimate hop popping is used, the egress PE router R2 may never even see the corresponding tunnel label. (If the ingress PE router R1 itself is the penultimate hop, a tunnel label may not even get pushed on.) Thus the present invention provides an additional label, which is made available to the egress PE router R2 (it may be encapsulated by the tunnel label so that it is preserved), and which is used by the egress PE router R2 to determine how to treat the received packet. This label is referred to as the "TLS label".

According to the present invention, when the ingress PE router R1 sends a (e.g., an Ethernet) packet to the egress PE router R2, it first pushes a TLS label on its label stack, and then (if R1 is not adjacent to R2) pushes on a tunnel label. The tunnel label gets the packet from the ingress PE router R1 to the egress PE router R2. The TLS label is not needed, and might not even be visible, until the packet reaches the egress PE router R2. To reiterate, the egress PE router R2 forwards the packet based on the TLS label.

Note that the tunnel could be a GRE encapsulated MPLS tunnel between the ingress PE router R1 and the egress PE router R2. In this case, the ingress PE router R1 would be adjacent to the egress PE router R2, and only the TLS label would be used. In such a case, the intervening network need only carry IP packets.

§ 4.2.2 Provisioning Transparent LAN Segments

At the edge of the transport network 110, each of the service provider edge devices (PEs) 120 has one or more ports that the service provider uses to couple a customer's LAN to the service provider's transport network 110. A given (logical) port on a service provider edge device PE 120 could be used to connect to only one virtual TLS. Thus a given (logical) port belongs to one TLS. A logical port, in principle, may include more than one physical ports Generally, a physical port will only belong to one logical port. However, if VLANs are to be supported, a logical port may be associated with a particular VLAN, and a physical port should be able to support multiple VLANs and hence, multiple logical ports.

For each TLS offered by a service provider, the service provider provisions its edge devices (PEs) such that within a given TLS, each (logical) port has a unique number (referred to as "port ID"). In addition, for each TLS offered by the service provider, the service provider estimates the number of ports that are to belong to the TLS. Note that this is just an estimate, and from a practical point of view the service provider should overprovision this number. For each TLS that has at least one port on a given service provider edge device (PE), the PE is configured with the estimated number of ports of that TLS.

Exemplary methods and data structures for effecting the provisioning of ports to TLSs, and TLS labels to ports, are described in more detail in § 4.4.1 below, with reference to FIGS. 5, 6 and 8.

§ 4.2.3 Network Configuration

To avoid the need to make global changes (i.e., to all PEs) to configuration information each time a port is added to a TLS, the present invention may permit the service provider to configure ports locally (i.e., at the given edge device PE having the added port). The present invention may do so by providing (e.g., signaling), to all other service provider edge devices (PEs) that support the TLS, an identifier of the service provider edge device, an identifier of the TLS, a port identifier and label information used by the port. The label information may include a label offset (if any), a label base, and a label range. Service provider edge devices (PEs) receiving such signaling may then update a layer 2 (MAC) forwarding information table (an/or TLS information) related to the TLS. Although an advertisement with label information could be broadcast to all PEs of a transport network, and each of the PEs could save the advertisement, even if it isn't relevant to the PE, for potential future use, having a PE save irrelevant advertisements imposes extra overhead on PEs. Therefore, a better alternative is to discard irrelevant advertisements, and have a PE use BGP Route Refresh Capability when a new TLS is added to the PE so that the information related to the new TLS can get to relevant PEs.

The service provider edge device (PE) may also update the layer 2 (MAC) forwarding information table related to the TLS based on packets received either locally, or from another (remote) service provider edge device (PE). If a forwarding entry for a particular layer 2 (MAC) destination address is not yet provided, instances of a packet destined to that layer 2 (MAC) address may be forwarded to any and all PEs having at least one port belonging to the relevant TLS. That is, multicasting packets based on "wild card" entries may be used as an interim solution until forwarding information for the layer 2 (MAC) destination device is learned/discovered.

Exemplary methods and data structures for effecting various aspects of configuration are described in more detail in § 4.4.3 below, with reference to FIGS. 7 and 13-15.

§ 4.3 EXEMPLARY APPARATUS

Figure 4:
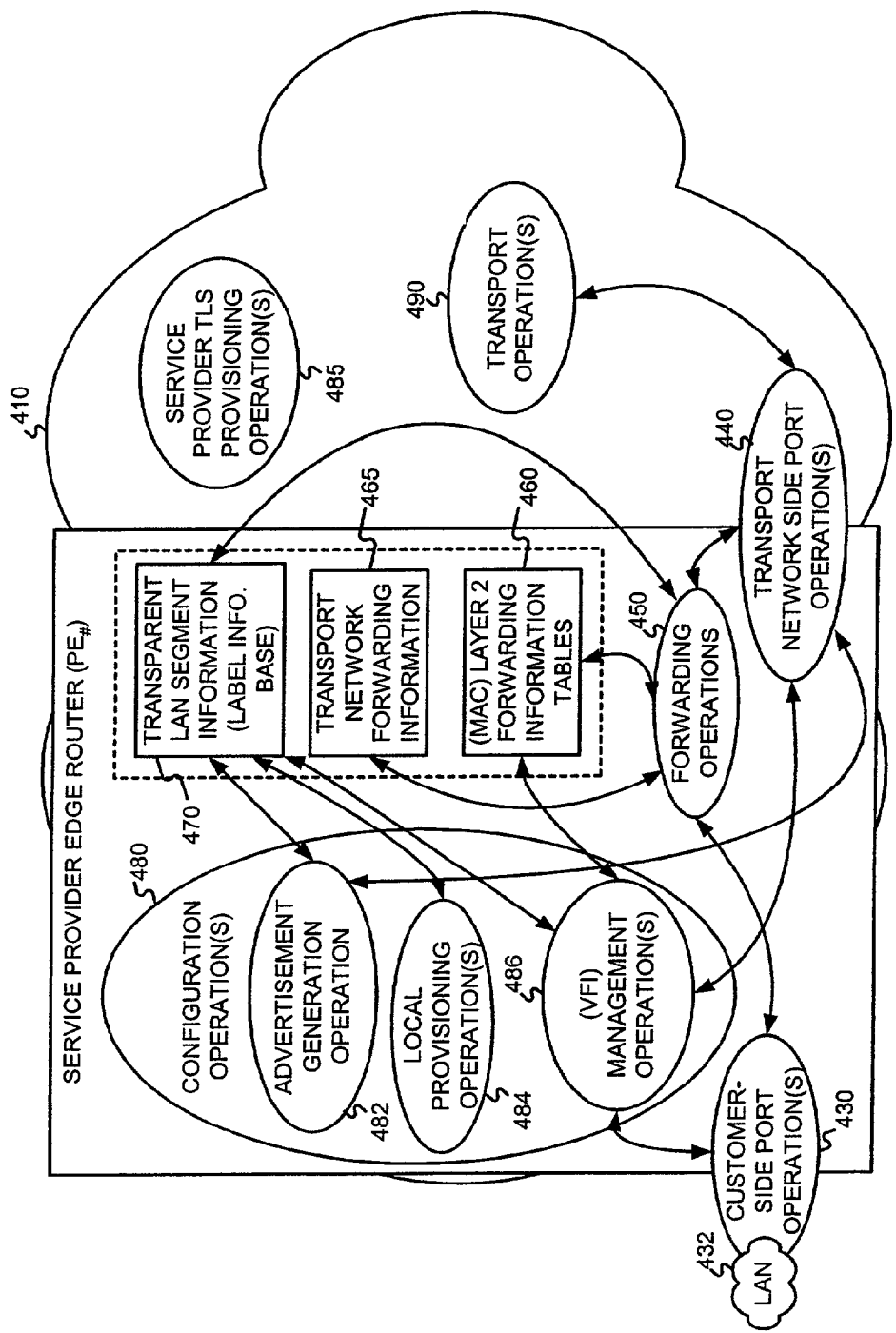
FIG. 4 is a bubble chart illustrating various operations that may be performed by, and various information that may be used by, service provider edge devices in accordance with the present invention.

FIG. 4 is a bubble chart of operations that may be effected by, and data that may be stored by, a service provider edge device (PE) to effect various aspects of the present invention. Generally, a service provider edge device (PE) will include customer-side port operation(s) 430 and transport network-side port operation(s) 440. The customer-side port operation(s) 430 may be coupled with a LAN 432. The transport network-side port operation(s) 440 may terminate links to other components of the transport networks 410. Basically, forwarding operations 450 are used to forward packets from a customer side-side port operation 430 or transport network-side port operation 440 to an appropriate one of a customer-side port or a transport network-side port, as determined based on information in the layer 2 (MAC) forwarding information tables (also referred to as "Virtual Forwarding Instances" or "VFIs") 460, transport network forwarding information 415, and/or TLS information 470.

Information in the VFIs, 460 is managed by VFI management operation(s) 486. Such operation(s) 486 can use packets received on port operations (including data packets and signaling or control packets), as well as transparent LAN segment information (also referred to as a label information base) 470 to manage the information in the VFIs 460. The transparent LAN segment information 470 may be generated by local provisioning operation(s) 484 (for distributed provisioning locally, such as at the service provider edge device) and/or service provider transparent LAN segment provisioning operation(s) 485 (for centralized provisioning). The transparent LAN segment information 470 may be advertised to other service provider edge devices (not shown), and particularly those supporting at least one common TLS, using advertisement generation operation(s) 482.

FIG. 16 is high-level block diagram of a machine 1600 which may effect one or more of the operations and/or store the data discussed above. The machine 1600 basically includes a processor(s) 1610, an input/output interface unit(s) 1630, a storage device(s) 1620, and a system bus(es) and/or a network(s) 1640 for facilitating the communication of information among the coupled elements. An input device(s) 1632 and an output device(s) 1634 may be coupled with the input/output interface(s) 1630. Operations of the present invention may be effected by the processor(s) 1610 executing instructions. The instructions may be stored in the storage device(s) 1620 and/or received via the input/output interface(s) 1630. The instructions may be functionally grouped into processing modules.

The machine 1600 may be a router for example. In an exemplary router, the processor(s) 1610 may include a microprocessor, a network processor, and/or (e.g., custom) integrated circuit(s). In the exemplary router, the storage device(s) 1620 may include ROM, RAM, SDRAM, SRAM, SSRAM, DRAM, flash drive(s), hard disk drive(s), and/or flash cards. At least some of these storage device(s) 1620 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 1620 and/or may be received from an external source via an input interface unit 1630. Finally, in the exemplary router, the input/output interface unit(s) 1630, input device(s) 1632 and output device(s) 1634 may include interfaces to terminate communications links.

Naturally, the operations of the present invention may be effected on systems other than routers. Such other systems may employ different hardware and/or software.

§ 4.4 EXEMPLARY METHODS AND DATA STRUCTURES

As introduced in § 4.2 above, three high-level applications may be performed by the present invention—provisioning transparent LAN segments, data forwarding, and configuring service provider edge devices to support transparent LAN segment service. Exemplary methods and data structures that may be used to effect these applications are described in §§ 4.4.1, 4.4.2 and 4.4.3, respectively, below.

§ 4.4.1 Provisioning Transparent LAN Segments of Virtual LANs

Figure 8:
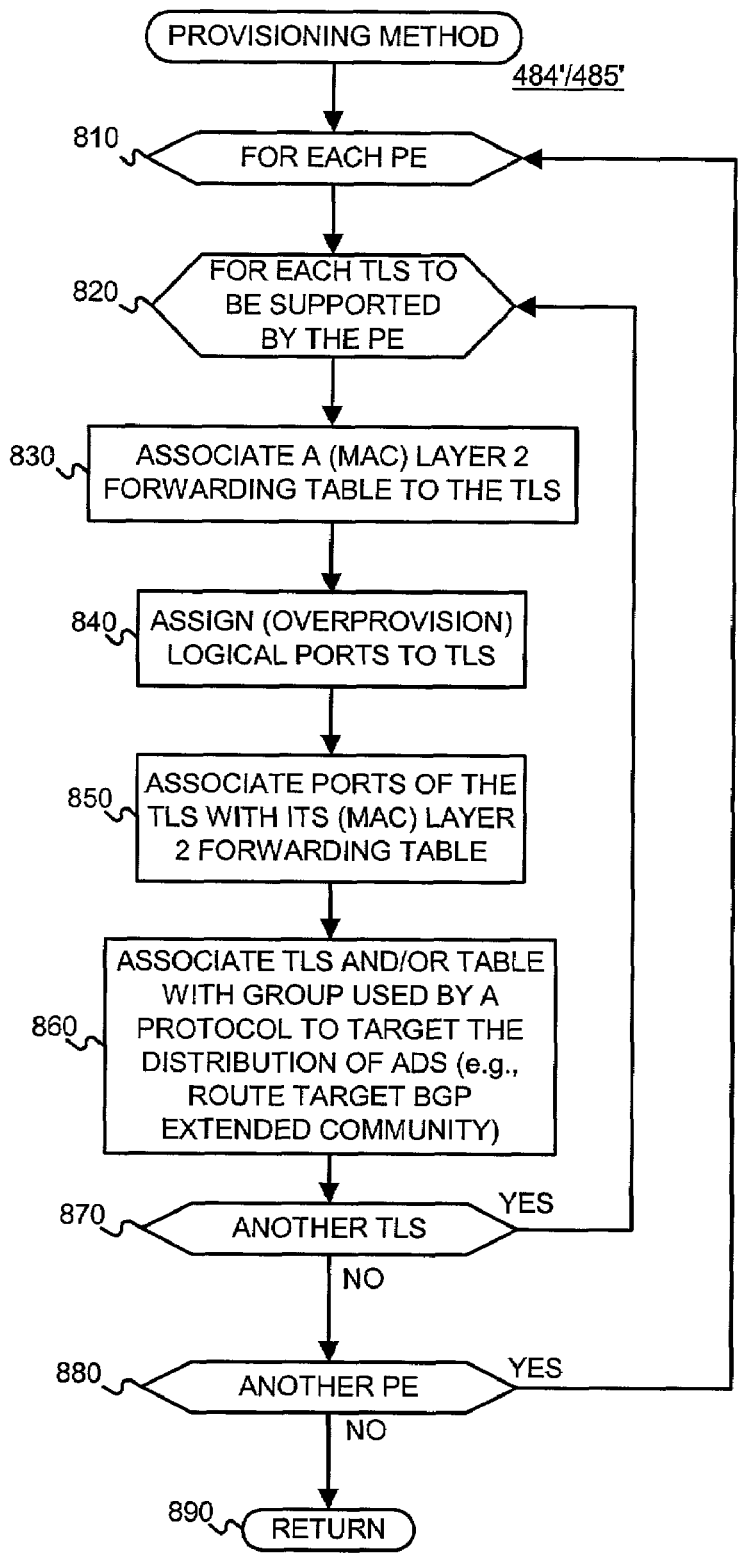
FIG. 8 is a flow diagram of an exemplary method that may be used to effect local (service provider edge device) provisioning operations.

FIG. 8 is a flow diagram of an exemplary method 484'/485' that may be used to effect the provisioning operations 484/485. As indicated by 810 and 880, a number of acts can be performed for each service provider edge device (PE). Such acts may be performed locally, at the given PE, although at least some of the provisioning will conform to a TLS-wide plan. Further, as indicated by 820 and 870, a number of acts are performed for each transparent LAN segment (TLS) that the given service provider edge device (PE) is to support. More specifically, as indicated by block 830, for each TLS to be supported by the given PE, a (MAC) layer 2 forwarding table (or more generally, a VFI) is associated with the TLS. An example of a TLS 710-(MAC) layer 2 forwarding table 730 association is illustrated in FIG. 7.

As indicated by block 840, for each TLS to be supported by the given PE, (logical) ports are assigned to the TLS. In one exemplary embodiment, the service provider sequentially numbers (starting with 1) the ports that belong to that TLS, as illustrated by columns 622 of FIG. 6. As a result, within a given TLS each port has a unique number, though different TLSs can have overlapping port numbers. This number is referred to as "port ID". Recall that for each TLS, the service provider estimates the number of ports that are to belong to the TLS. Recall further that this is just an estimate, and from a practical point of view the service provider should overprovision this number. For each port of a TLS, the port is provisioned with a number of TLS labels used to reach the other ports (or potential future ports) of that TLS.

Figure 5:
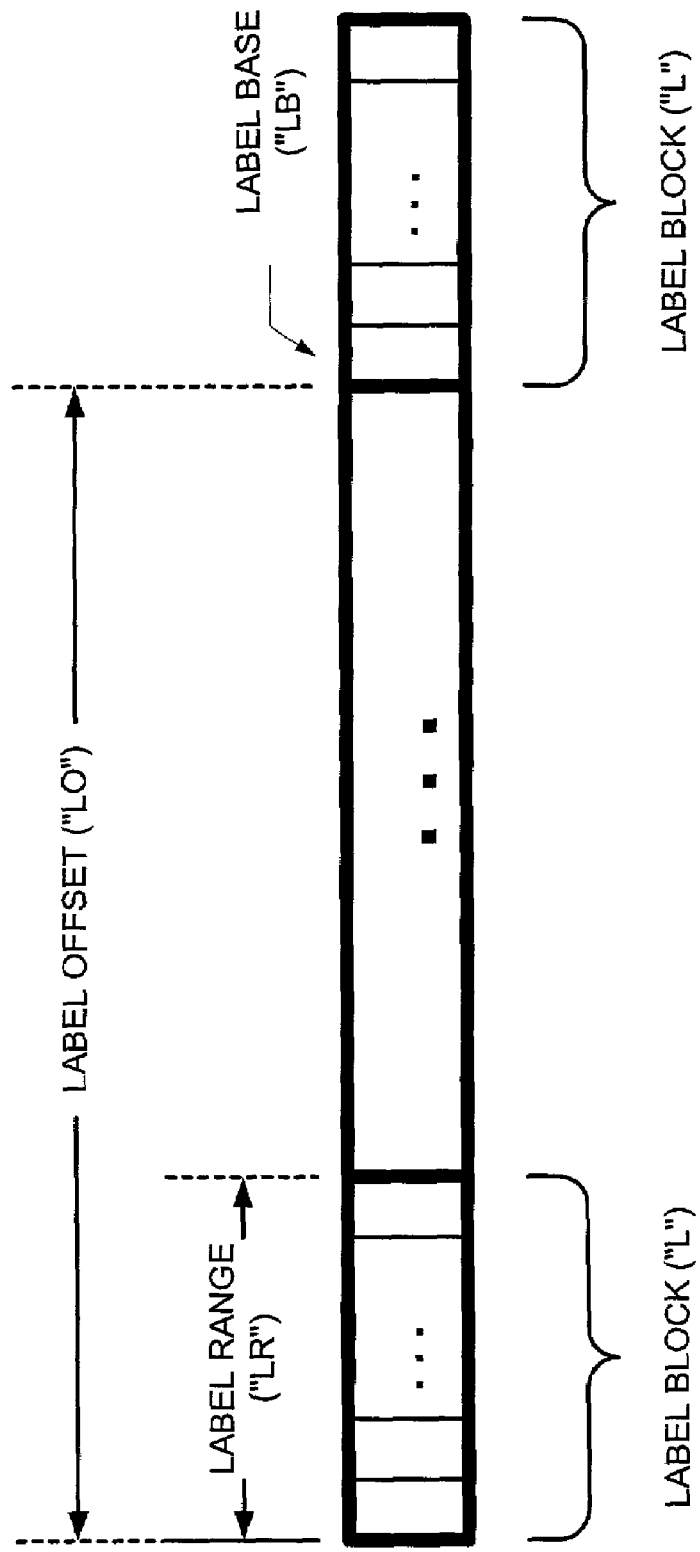
FIG. 5 is a block diagram illustrating the concept of a set of label-blocks associated with a (logical) port.

FIG. 5 illustrates terms used in a naming convention to describe exemplary TLS labels that may be used in the present invention. For each TLS port configured on a PE, the PE chooses a contiguous group of labels, with the number of labels in the group being equal to the estimated number of ports to be associated with that TLS. This set is referred to as a "label-block". As shown in FIG. 5 and columns 626 and 628 of FIG. 6, the smallest label in a label-block is referred to as the "label-base" and the number of labels in the label-block is referred to as the "label-range". To allow a service provider to add more (logical) ports to particular TLS at a later time, the PE could be provided with a new label-block with n labels, where n is the number of additional ports. This process might be repeated several times if and when more ports are added. As shown in FIG. 5 and column 624 of FIG. 6, to permit the multiple label-blocks to be distinguished, a block offset is used to identify the position of a given label-block in the set of label-blocks associated with a (logical) port. For a label-block m, this label-block is denoted as "Lm", its block offset is denoted as "LOm", its label-base is denoted as "LBm", and its label-range is denoted as "LRm".

Referring back to FIG. 8, as indicated by block 850, on the given PE, (logical) ports that belong to the particular transparent LAN segment (TLS) are associated with the VFI (e.g., a layer 2 (MAC) forwarding information table) of that TLS. This association means that the forwarding of data from/to these (logical) ports is to be controlled by the information in the VFI associated with these (logical) ports. Alternatively, or in addition, TLS information 470 may include a TLS label-to-local port mapping which may be used for forwarding. As indicated by block 860, the TLS and/or VFI are associated with a group used by a protocol to target the distribution of advertisements. As shown in FIG. 7, in one exemplary embodiment each VFI is a layer 2 (MAC) forwarding information table having 730 a Route Target BGP Extended Community 720 associated with it. This community is used by the PE for importing (i.e., accepting advertisements) and/or exporting (i.e., sending out advertisements) routing information associated with a particular TLS.

§ 4.4.2 Data Forwarding

Recall that as a packet destined for a particular device (as defined by a layer 2, e.g., MAC, address) is forwarded from a source device on a first LAN to a destination device on a second LAN, where both the first and second LANs are coupled with a transparent LAN segment, it traverses a path having three basic parts; namely, (i) from the first LAN to an associated ingress service provider edge device (PE), (ii) from that ingress service provider edge device (PE) to an egress service provider edge device (PE) associated with the second LAN having the destination device, and (iii) from that egress service provider edge device to the second LAN. (Note that the first and second LANs could be coupled with the transparent LAN segment via the same PE. In such a case, since one PE serves as both the ingress PE and egress PE, the second part of the path is not applicable.) Each of these three parts of the forwarding is described below, with reference to FIGS. 3, 4, 7, 9 and 10. First, however, since the data structure of an exemplary layer 2 (MAC) forwarding information table (or VFI) 460' is used in such forwarding, it is described with reference to FIG. 7.

As shown in FIG. 7, the VFI is a layer 2 (MAC) forwarding information table 730 that is associated with a transparent LAN segment 710, a group used for targeting the distribution of advertisements (e.g., a route target BGP extended community) 720 and (logical) ports (not shown). In this exemplary embodiment, the VFI is modeled as a table 730 having three types of entries—remote, local, and wildcard. A "remote" type entry includes (a) layer 2 (e.g., MAC) address, (b) a TLS label, and (c) an egress PE. A "local" type entry includes (a) a layer 2 (e.g., MAC) address, and (b) a local outgoing port. Finally, a "wild card" type entry includes a list of {TLS label, egress PE} tuples. Note that for each local port that belongs to a particular TLS, the VFI 730 associated with the TLS maintains exactly one wild card type entry. Wild card type entries are used until a MAC address-port or MAC address-TLS label-egress PE association is discovered/learned.

Forwarding on the Ingress PE

Recall that a "tunnel" label is used to forward packets over the transport network 110, from an ingress service provider edge device (PE) to an egress service provider edge device (PE). Recall further that a TLS label is used by the egress PE to select a particular outgoing port. Therefore, the ingress (PE) stacks a TLS label and a tunnel label onto an incoming packet. Briefly stated, the TLS label and the appropriate egress PE is determined based on information stored in a VFI (e.g., a layer 2 (MAC) forwarding information table). The "tunnel" label is determined from information in a forwarding table using the egress PE, the contents of which may be managed using known protocols or techniques. Finally, recall that a tunnel label might not be needed for "local" forwarding through a single given PE.

FIG. 9 illustrates the arrangement of FIGS. 9A and 9B which collectively illustrate a flow diagram of an exemplary method 450a' that may be used to effect at least a part of forwarding operations 450. As indicated by decision block 905, the main part of the method 450a' is invoked upon receipt of a packet. As indicated by block 910, the ingress PE uses the (logical) port on which the packet was received to select the (MAC) layer 2 forwarding table (or VFI) associated with the port (Recall the port-VFI association performed during provisioning.). Once the associated (MAC) layer 2 forwarding table (or VFI) is found, the ingress PE searches it for an entry whose MAC address is equal to the destination MAC address in the packet.

As shown in FIG. 7, the exemplary table 730 includes a column 734 including MAC addresses. Also note that the entries (rows) of the exemplary table 730 include a type value 732 which is either (a) "remote", (b) "local", or (c) "wild card". As indicated by 915 of FIG. 9, the remaining part of the method 450a' is dependent on the type of the entry matching the MAC address. If the entry is found, and the entry type is "local", then, as indicated by block 920, the ingress PE determines the outgoing port of the matching entry. (See, e.g., column 738 of FIG. 7.) As indicated by block 925, the ingress PE then sends the packet out on the outgoing port identified, as specified in the found entry, before the method 450a' is left via RETURN node 960. Since the port is local, that is no egress PE is involved, no "tunnel" label is needed in this case.

Referring back to 915, if an entry with a matching MAC address is found, and the entry type is "remote", then, as indicated by block 930, the ingress PE determines the TLS label and the egress PE from the found entry (See, e.g., columns 738 and 739 of FIG. 7.). As indicated by block 932, the TLS label is added to the packet. Then, as indicated by block 934, the packet with the TLS label is prepared for transport to the egress PE. If a label switched path exists between the ingress and egress PEs, this act may involve providing the packet with the TLS within a tunnel label. Then, as indicated by block 936, the resulting packet is forwarded through the transport network towards the egress PE, before the method 450a' is left via RETURN node 960.

Referring back to 915, if neither a local, nor a remote type entry is found (i.e., if no entry has a matching MAC address), or if the destination MAC address is either broadcast or multicast, the packet is handled by using a wild card type entry associated with the port as follows. The wild card type entry may include a number of {TLS label, egress PE} tuples. More specifically, as indicated by loop 942-950, for each {TLS label, egress PE} tuple from the wildcard entry, a number of acts are performed. That is, for each {TLS label, egress PE} tuple from the wildcard entry, the ingress PE applies (e.g., prepends) the TLS label to (an instance of) the packet as indicated by block 944, prepares the packet for transport to the egress PE as indicted by block 946, and sends the packet toward the specified egress PE as indicted by block 948. Referring, via node A 951, to FIG. 9B, in addition, if there are other ports on the PE associated with the same VFI (i.e., all ports 738 of any and all "local" type entries), (an instance of) the packet is sent on all these ports. In this case, the TLS label needn't be applied. More specifically, as indicated by loop 952-958, for each "local" type entry, an outgoing port is determined as indicated by block 954 and (an instance of) the packet is put on the determined outgoing port as indicated by block 956. The method 450a' is then left via RETURN node 960.

As can be appreciated from the foregoing, wild card type entries can be used if the port/PE serving the destination MAC address isn't known. In such a case, the packet may be multicast to all PEs and ports of the TLS known to the ingress PE. Although such multicasting is not efficient, it is an interim measure, only used until the ingress PE "learns" or "discovers" the port and PE which serve the device having the relevant MAC address.

Forwarding from the Ingress PE to the Egress PE

The second part of the path—from the ingress service provider edge device PE to the egress service provider edge device PE—may exploit known forwarding techniques, such as known label switched path forwarding techniques. FIG. 3 illustrates the forwarding of a packet 340 with a TLS label encapsulated in a tunnel label. The tunnel label, initially "5", is changed to "9" by the label-switching router 330a, and then changed from "9" to "2" by the label-switching router 330b.

Forwarding on the Egress PE

FIG. 10 is a flow diagram of an exemplary method 450b' that may be used to forward packets received on the egress service provider edge device (PE). As indicated by decision block 1010, the main part of the method 450b' is triggered upon receipt of a packet (e.g., from a port coupled with a node of the transport network). At block 1012, the tunnel label may be stripped (if it was not already stripped at the penultimate hop, i.e., the node immediately preceding the egress service provider edge device). A given PE may support single lookup forwarding, double lookup forwarding, or both. FIG. 10 illustrates operations of an exemplary PE supporting both. Decision block 1015 is used to determine whether the egress PE is to use single lookup forwarding, or double lookup forwarding. Single lookup forwarding can use the TLS label and TLS information 470 to determine a port as indicated by block 1035. The TLS label may then be stripped as indicated by block 1040, before the packet is placed on the determined port as indicated by block 1050, before the method 450b' is left via RETURN node 1080. As will be described in § 4.3.3 below, with reference to FIG. 15, the TLS label is used for layer 2 (e.g., MAC) address learning. Since such learning uses the TLS label, it should be performed before the TLS label is stripped. If the TLS information has no mapping of the TLS label to a port, the method 450b' may try to forward the packet using double lookup forwarding (discussed with reference to blocks 1020, 1025, 1030, 1040, 1050, 1060 and 1070 below).

Referring back to decision block 1015, if double lookup forwarding is to be used, as indicated by block 1020, an appropriate (MAC) layer 2 forwarding information table (or VFI) is determined based on the TLS label of the received packet. Then, as indicated by decision block 1025 and block 1030, if the VFI has a local type entry with a MAC address matching the packet's destination MAC address, using the determined VFI table, an outgoing port is determined based on the destination MAC address of the packet. (Recall, e.g., columns 734 and 738 of a "local" entry.) As indicated by block 1040, the TLS label may be removed at this point. As mentioned above, since layer 2 (MAC) address learning uses the TLS label, it should be performed before the TLS label is stripped. Finally, as indicated by block 1050, the packet is placed on the determined outgoing port, before the method 450b' is left via RETURN node 1080. Referring back to decision block 1025, if the VFI does not have a local type entry with a MAC address matching the packet's destination MAC address, then the TLS label may be removed as indicated by block 1060 and (an instance of) the packet is placed on all local ports that belong to the TLS as indicated by block 1070, before the method 450b' is left via RETURN node 1080.

Grouping Ports Belonging to the Same TLS into One Logical Port

As alluded to above, if a PE has several ports that belong to a particular TLS, instead of assigning port IDs to each such port, the PE could assign just a single Port ID. Moreover, rather than creating and advertising label-blocks on a per (physical) port basis, the PE could create and advertise label-blocks just for one (logical) port. Such a scheme would create an association not between a port and a set of label-blocks, but between a particular VFI and a set of label-blocks. This scheme assumes that in the label information base maintained by the PE, the labels that are defined by the label-blocks that the PE advertises to other PEs point not to a particular outgoing interface, but to a particular VFI (the VFI that the label-blocks are associated with). Moreover, this scheme assumes that when the PE receives a packet with a TLS label, to determine where to forward the packet, the PE uses the TLS label to select a particular VFI, and then performs the lookup in that VFI table using the MAC destination address carried in the packet. Finally, if the VFI doesn't have a local entry with the matching MAC address, the PE sends the packet on all the local ports associated with the VFI.

§ 4.4.3 Configuration

In the forwarding operations described in § 4.4.2 above, it was assumed that the VFI (e.g., the layer 2 (MAC) forwarding information table) was populated with appropriate entries. Although these entries may be manually entered and maintained, doing so would be difficult, slow, labor intensive, and subject to human-error. This section describes exemplary ways of maintaining the VFI. Entries of the VFI may be generated and/or maintained based on advertisements and based on (e.g., "learned" from) information taken from packets entering or exiting the transport network. Exemplary methods and data structures for performing such advertisement and VFI maintenance are described here.

For each TLS (logical) port configured on a service provider edge device (PE), the PE distributes to other PEs the information about all its label-block(s), as well as about the port ID(s) of the PE. As a result, a PE that has a particular TLS configured on it will have information about (a) which remote PE(s) has a (logical) port of the TLS with a particular port ID, and (b) the set of label-blocks that the remote PE advertises for that particular (logical) port.

FIG. 13 is a flow diagram of an exemplary method 482' that may be used to effect an ad generation operation 482. As indicated by block 1310, information related to a (logical) port (e.g., port ID, label-blocks, etc.) is obtained. Recall from FIG. 4 that this may have been provisioned and stored in a label information base 470. As indicated by block 1320, a contiguous set of labels is defined, starting with the label base and proceeding to {label base+label range−1}. Then, as indicated by block 1330, an ad is assembled based on this information. FIG. 14 illustrates an exemplary data structure 1400 that may be used to advertise provisioned TLS-port information. As shown, this exemplary data structure 1400 may include an identifier of the PE generating the ad (e.g., an Internet protocol layer 3 address) 1410, a TLS identifier 1420, a (logical) port ID 1430, label-block offset (if any) 1440, a label base 1450, a label range 1460, and any further information 1470. Referring back to FIG. 13, as indicated by block 1340, the ad is then sent (e.g., multicast) to other PEs. If a full mesh topology is desired, the ad should be send to all other PEs. The method 482' is then left via RETURN node 1350. Such ad distribution may be accomplished by using BGP, and is related to the method described in U.S. patent application Ser. No. 09/865,050, entitled "TRANSPORT NETWORKS SUPPORTING VIRTUAL PRIVATE NETWORKS, AND CONFIGURING SUCH NETWORKS", filed on May 24, 2001 by Kireeti Kompella. That application is incorporated herein by reference.

A PE receiving an ad may use information in such an ad to add and/or maintain information in one of its VFIs (e.g., layer 2 (MAC) forwarding information tables). Such a PE may also use information in packets to add or maintain such information. FIG. 15 is a flow diagram of an exemplary method 486 that may be used to effect a VFI management operation(s) 486. In the exemplary method 486', 1510 can determine whether or not various trigger events occur. The trigger events include the receipt of an advertisement, the receipt of a packet on a local port and the receipt of a packet (directly or indirectly) from another service provider edge device (PE).

When a PE receives a TLS advertisement, it checks if the received Route Target Community (or more generally, a group used for targeting the distribution of the ads) matches that of any of its VFIs (Recall, e.g., 720 and 730 of FIG. 7.) as indicated by decision block 1520. If not, the PE may store the advertisement for future use (for example, if a port of the PE is provisioned to the TLS later), or may discard it as indicated by block 1525, before the method 486' is left via RETURN node 1570. If BGP is used as the auto-discovery and signaling protocol, a PE can use the BGP Route Refresh capability to learn all the discarded advertisements pertaining to a TLS at a later time, if and when the TLS is configured on the PE. Referring back to decision block 1520, if, on the other hand, the ad's route target community matches that associated with any of the PE's VFIs, the wild card VFI entry is updated as based on the (e.g., BGP) information a PE receives from other PEs. Specifically, when the PE receives an (e.g., BGP) update from some other PE, and the Route Target on the update matches the route target configured for a particular VFI on the local PE, the PE sets a {label, egress PE} tuple of the wild card type entry for a particular logical local port associated with that VFI as indicated by block 1530, before the method 486' is left via RETURN node 1570. More specifically, the egress PE of the wild card type entry may be set to the address carried in the NEXT_HOP of the update. The label in the wild card type entry for a local port with the Port ID k, may be set to $LBm+k-LOm$, where the label-block m satisfies $LOm<=k<LOm+LRm$.

Referring back to 1510, when a PE receives a local (ingress) packet, it may update or add a "local" type of the VFI associated with the local port entry. More specifically, as indicated by block 1540, the "local" type VFI entries on a PE may be updated using the packets that the PE receives on the (local) ports associated with the TLS that the VFI is associated with. For example, when a PE receives a packet on one of its local ports, the PE creates a "local" type entry in the VFI that the port is associated with. In the "local" type entry, the MAC address 734 is set to the MAC source address in the packet, and the outgoing port 738 is set to the port on which the packet was received. The method 486' is then left via RETURN node 1570.

Referring back to 1510, when a PE receives a packet from some other PE (also referred to as a "remote packet" or an "egress packet"), it may update or add a "remote" type VFI entry. More specifically, as indicated by block 1550, the PE may use the TLS label of the packet to determine the ingress PE and the port on the ingress PE where the packet came from. This may be done as follows. First the PE searches through the label-blocks that it advertises (or had advertised) to other PEs for the block m that satisfies $LBm<=TLS\_label<LBm+LRm$. (Recall label information base 470 of FIG. 4.) Once the label-block that satisfies the condition is found, the port ID of the ingress port is defined as $LOm+TLS\_label-LBm$. The TLS label also identifies a particular VFI, and therefore a particular TLS that has this port. Using this port ID and the BGP routing information that the PE received from other PEs, the PE can determine the address of the ingress PE. (Recall fields 1410 and 1430 of the ad 1400 of FIG. 14.) Once the PE determines the ingress PE and the port on the ingress PE where the packet came from, as indicated by block 1560, the PE creates a "remote" type entry with the MAC address 734 set to the MAC source address in the packet, the egress PE 739 set to the address (or some other identifier) of the ingress PE, and the TLS label 736 set to a value determined as follows. Denoting the port ID of the port on the ingress PE as k, the TLS label in the "remote" type entry is set to $LBm+k-LOm$, where the label-block m satisfies $LOm<=k<LOm+LRm$. (Note that the above could be precomputed, so that when the PE receives a packet with a TLS label, a single table lookup on this label would produce both the address of the ingress PE (the PE where the packet came from), and the TLS label that should go into the VFI table "remote" type entry.) The method 486' may then be left via RETURN node 1570.

As indicated by the foregoing, labels provide the egress PE with the information about the ingress PE and the port on the ingress PE where the packet came from. This is used by the egress PE for what is known as "MAC address learning", and specifically for discovering a particular {PE, port} pair that should be used to reach a particular MAC address.

As PE advertises a set of label-blocks associated with a given PE's port (means the advertisement carries the Port ID of that port), the PE installs all labels from this set in its Label Information Base with the port as the outgoing interface. As a result, when the PE receives a packet with any label that belongs to the set, the PE would send the packet (after stripping the label) over the port associated with the set.

§ 4.4.4 Supporting VLAN Flooding Scope

Each customer port on a PE, in addition to being associated with a particular TLS, could be also associated (e.g., via provisioning) with one of more VLANs of that TLS. In such a case VLAN membership information may be distributed (e.g., as part of BGP updates by using a VLAN Extended Community attribute). When a PE receives a BGP Update that carries a TLS advertisement, it checks if the received Route Target community matches any TLS that it is a member of (just like it does in the absence of VLAN flooding scope). If there is a match, then the PE further checks whether any of the VLANs Extended Community attributes of that update match any of the VLANs associated with the TLS. Only if the match is found, the VFI associated with that TLS is updated with the received information. Alternatively, a TLS could be associated with a single VLAN. In such a case, the TLS procedures described could be applied.

To support VLAN flooding scope, each VFI entry may be extended to include not just the MAC address, but also an associated VLAN tag. In such a case, the lookup in the VFI would be performed based on a {MAC address, VLAN tag} tuple. To reiterate, alternatively, a TLS could be associated with a single VLAN. In such a case, the TLS procedures described could be applied.

§ 4.5 EXEMPLARY OPERATIONS

Examples illustrating exemplary provisioning, configuration and forwarding operations in an exemplary embodiment of the present invention are now provided.

§ 4.5.1 Provisioning and Configuration Example

An example of provisioning a transparent LAN segment (TLS) and of disseminating (e.g., advertising) and learning or discovering configuration information in accordance with the present invention is now described with reference to FIGS. 5, 7-9, 15, 17 and 18.

Referring first to FIG. 17, which is a messaging diagram illustrating exemplary advertisement operations in an exemplary embodiment of the present invention in which service provider edge devices PE0 and PE2 have ports that belong to TLS=i. More specifically, PE0 includes ports, identified as Port ID=0 and Port ID=1, of TLS=i, and PE2 includes a port, identified as Port ID=4, of TLS=i. (Recall, e.g., block 840 of FIG. 8.) Note that although the Port IDs can be provisioned centrally, or locally at each PE, the provision of Port IDs for a given TLS will be in accordance with a global (e.g., service provider-wide or transport network-wide) plan.

At PE0, Port ID 0 has a first label-block with a label-block offset of 0, label base of 1000, and a range of 10. (Recall, e.g., FIG. 5.) In this example, suppose that more labels were needed. To accommodate this further need, a second label-block with a label-block offset of 10, a label base of 1100 and a range of 9 is also provided. Also at PE0, Port ID 1 has a label-block with a label-block offset of 0, a label base of 2000 and a range of 20. This information is distributed to other PEs (particularly those that support TLS=i) as indicated by advertisement 1710. Note that although the advertisement 1710 is indicated as a single message (Recall, e.g., FIG. 14.), the information could be carried in multiple advertisements. Similarly, at PE2, Port ID 4 has a first label-block with a label-block offset of 0, a label base of 4000, and a range of 15. This information is distributed to other PEs (particularly those that support TLS=i) as indicated by advertisement 1720. Note that although the label numbers do not overlap in this example, the labels assigned to a port can overlap with that of another port on another PE. That is, label numbers should be unique per PE.

Referring to both FIGS. 15 and 17, when PE2 receives the advertisement 1710, it sets a {label,egress PE} tuple(s) of the wild card entry (Recall, e.g., 736 and 739 of FIG. 7.) of the (MAC) layer 2 forwarding information table associated with TLS=i. More specifically, recall that the egress PE of the wildcard entry may be set to the address carried in the NEXT_HOP of the update. In this case, the PE is set to PE0. Recall also that the label in the wild card entry for a local port with the Port ID k, may be set to LBm+k−LOm, where the label-block m satisfies LOm<=k<LOm+LRm. Thus, the first TLS label is set to 1000+4−0=1004, and a second TLS label is set to 2000+4−0=2004. (Note that a wild card entry label is not determined using the offset labels because the label offset (10) does not satisfy the condition that it is less than or equal to the port number (4).) As shown in FIG. 17, the wild card entry for the table for TLS=i are updated to include the following tuples: {egress PE=0, TLS label=1004}; and {egress PE=0, TLS label=2004}.

Similarly, when PE0 receives the advertisement 1720, it sets a {label,egress PE} tuple(s) of the wild card entry (Recall, e.g., 736 and 739 of FIG. 7.) of the (MAC) layer 2 forwarding information table associated with TLS=i. In this case, the PE is set to PE2. The TLS label is set to 4000+0−0=4000. This entry is for any packets that PE0 receives on the port with Port ID=0. Since Port ID=1 also belongs to TLS=i, PE0 also needs to compute a wildcard label for any packets PE0 receives on the port with Port ID=1 (unless the egress PE is to use double lookup forwarding (exclusively)). For such packets the label will be 4000+1−0=4001. Thus, each ingress port has its own forwarding table (at least conceptually). That is (at least conceptually), on PE 0, there is not one, but two forwarding tables for TLSi—one used for handling packets received on PortID=0, and another used to handle packets received on PortID=1. This allows the egress PE to use single lookup (TLS label→port) forwarding, and avoids the need to use double lookup (TLS label→TLS table, and MAC address→port) forwarding. With the double lookup forwarding alternative, only one label per TLS need be provided on a PE, even if the PE has more than one port associated with that TLS.

As shown in FIG. 17, the wild card entry for the table for TLS=i is updated to include the following tuples: {egress PE=2, TLS label=4000} and {egress PE=2, TLS label=4001}.

Recall also that the present invention enables local and remote MAC address learning. More specifically, it enables a outgoing port to be associated with a local MAC address and it enables a TLS label and an egress PE to be associated with a remote MAC address. (Recall FIG. 7.) FIG. 18 illustrates such MAC address learning. Assume that a packet 1810 arrives on a local port of PE 2. This packet 1810 may be an Ethernet packet and may include a source MAC address and a destination MAC address, as well as data. (Note that the present invention may support LANs other than Ethernet LANs and layer 2 addresses other than MAC addresses.) Assume that the table of PE2 associated with TLS=i does not include any remote or local entries having a MAC address that matches the destination MAC address of the packet. Recall from block 940 of FIG. 9, that the wild card tuple(s) are used in this case. Recall from FIG. 17 that these wild card tuples are, or include: {egress PE=0, TLS label=1004}; and {egress PE=0, TLS label=2004}. A tunnel label, that is a label to get data to PE0 is known, and may have been determined using a known protocol, such as an MPLS protocol for example. As shown in FIG. 18, packet(s) 1820 may include the original packet 1810, encapsulated in the TLS label from the wildcard entry and the tunnel label. Although it would be preferable to send two separate packets 1820 with the two different TLS labels, only one is shown to simplify the drawing.

Ultimately, the packet 1820' will arrive at PE0. Notice that the packet 1820' is similar to that 1820, but the tunnel label has changed as the packet progressed along a label-switched path (not shown) between PE2 and PE0. PE0 now updates/creates a remote entry(ies) in its (MAC) layer 2 forwarding table associated with TLS=i. More specifically, PE0 may use the TLS label(s) of the packet(s) 1820' to determine the ingress PE (PE2) and the port (Port ID=4) on the ingress PE where the packet came from. (Recall, e.g., 1550 of FIG. 15.) This may be done as follows.

First PE0 searches through the label-blocks that it advertises to other PEs for the block z that satisfies LBz<=TLS label<LBz+LRz. In this example, for the TLS label=1104, the first label-block of port 0 satisfies the condition since 1000<=1004<1000+10. Similarly, for the TLS label=2004, the first label-block of port 1 satisfies the condition since 2000<=2004<2000+20.

In each case, once the label-block is found, the port ID of the ingress port is defined as LOz+TLS_label−LBz. Each case gives the same result. That is, the Port ID=0+1004−1000=4, or 0+2004−2000=4. The label block(s) satisfying the condition also identifies a particular VFI, and therefore a particular TLS that has this port. Using this Port ID and the BGP routing information that PE0 received from PE2, PE0 can determine the address of the ingress PE (PE2). (Recall message 1720 of FIG. 17 and fields 1410 and 1430 of the ad 1400 of FIG. 14.) Once PE0 determines that the ingress PE is PE2, and the port on PE2 where the packet came from as Port ID=4, the PE creates a "remote" type entry with the MAC address 734 set to the MAC source address of the packet, the egress PE 739 set to the address of the ingress PE2, and the TLS label 736 set to a value determined as follows. (Recall 1560 of FIG. 15.) Denoting the Port ID of the port on the ingress PE as k, recall that the TLS label in the "remote" type entry is set to LBm+k−LOm, where the label-block m satisfies LOm<=k<LOm+LRm. (Note that the above could be precomputed, so that when the PE receives a packet with a TLS label, a single table lookup on this label would produce both the address of the ingress PE (the PE where the packet came from), and the TLS label that should go into the VFI "remote" type entry.) In this example, the TLS labels are 4000+0−0=4000 (used for data arriving on port assigned port ID=0), and 4000+1−0=4001 (used for data arriving on port assigned port ID=1). Thus, if a particular MAC address, MAC1, is reachable via PortID=0, and another MAC address, MAC2 is reachable via PortID=1, then PE2 wants to send data to MAC1 PE2 needs to put different inner label then when sending data to MAC2. In this way, egress PE0 need only perform single lookup forwarding (just on the label), and avoids the need to perform double lookup forwarding (first on the label to find the appropriate TLS, and then on the MAC address to find out the specific outgoing port).

Back at PE2, a local type entry for the (MAC) layer 2 forwarding table associated with TLS=i (and Port ID=4) may be updated/generated. In this example, the MAC address of the entry (Recall, e.g., 734 of FIG. 7.) is set to the source MAC address of the packet 1810, and the outgoing port of the entry (Recall, e.g., 738 of FIG. 7.) is set to the port on which the packet 810 was received (i.e., Port ID=4.).

The foregoing example illustrated how the present invention supports provisioning and the population of the VFI (e.g., a layer 2 (MAC) forwarding table) based on advertisements and layer 2 (MAC) address learning. Now, in § 4.5.2 below, examples illustrating data forwarding using such information is described.

§ 4.5.2 Data Forwarding Example

Examples of data (e.g., a packet) being forwarded in accordance with the present invention are now described with reference to FIGS. 3, 7, 9-12, and 18.

In a first example, assume that a data packet having a destination MAC address arrives at PE 2 and further assume that the (MAC) layer 2 forwarding table (associated with the Port ID that received the packet) has a local type entry having a MAC address (Recall 734 of FIG. 7.) that matches the destination MAC address of the packet. In this case, the outgoing port (Recall 738 of FIG. 7.) of the local type entry is used to determine the outgoing port of PE 2 on which to place the packet. (Recall, e.g., 920 and 925 of FIG. 9.)

In a second example, referring to FIG. 12A, assume that a packet 1210 having a destination MAC address 1212 is received at a port assigned to port ID=0 on PE 0 and further assume that the (MAC) layer 2 forwarding table (associated with the Port ID that received the packet) has a remote type entry having a MAC address (Recall 734 of FIG. 7.) that matches the destination MAC address of the packet. (Recall, e.g., block 930 of FIG. 9.) In this case, recall from FIG. 18 that the TLS label 736 had been set to 4000 and the egress PE 739 had been set to PE2. Recall further from FIG. 17 that the tunnel label to get to PE 2 is "9999". As shown in FIG. 12A, the packet 1210 is provided with the TLS label (set to 4000) 1224 and transport encapsulation (e.g., a tunnel label set to "9999") 1222. (Recall, e.g., blocks 932 and 934 of FIG. 9.) The resulting packet 1220 is forwarded, using, for example, known forwarding techniques such as label-switched routing, to PE 2. (Recall, e.g. block 936 of FIG. 9.)

Referring to FIG. 12B, which illustrates double lookup forwarding at the egress PE, the packet 1220' arriving at PE 2 is similar to the packet 1220 that left PE 0, but the tunnel label 1222' will have changed. At PE 2, an appropriate (MAC) layer 2 forwarding information table (or VFI) is determined based on the TLS label of the received packet. (Recall, e.g., block 1020 of FIG. 10.) In this example, PE 2 knows that label 4000 is associated with TLS=i. (Recall, upper right hand portion of FIG. 17 which includes a label information base. Recall also association of 710 and 730 of FIG. 7.) Then, using the determined VFI, an outgoing port is determined based on the destination MAC address 1212 of the packet 1210. (Recall, e.g., columns 734 and 738 of a "local" type entry, whose values were entered as a part of local MAC learning.) At this point, the TLS label and the tunnel label (if any) may be removed (if they haven't already been removed earlier). (Recall, e.g., 1040 of FIG. 10.) Finally, the packet is placed on the determined outgoing port. (Recall, e.g., 1050 of FIG. 10.) In this example, assume that the destination MAC address 1212 of the packet 1210, is that same as the source MAC address of the packet 1810 of FIG. 18. In this case, the outgoing port would be port ID=4.

FIG. 12C illustrates single lookup forwarding at the egress PE. Here, the TLS label of the packet 1220' arriving at PE 2 is used (as a key) to lookup a port in the TLS information. (Recall, e.g., 1035 of FIG. 10.) At this point, the TLS label and the tunnel label (if any) may be removed (if they haven't already been removed earlier). (Recall, e.g., 1040 of FIG. 10.) Finally, the packet is placed on the determined outgoing port. (Recall, e.g., 1050 of FIG. 10.)

§ 4.6 CONCLUSIONS

As can be appreciated from the foregoing detailed description, the present invention permits a service provider to provide a transparent LAN segment service over a transport network. This service is easy to provision. Further, it is easy to add more ports. Finally customers can use a mature, inexpensive technology, such as Ethernet LANs, without the geographic limitations traditionally found in such technologies. Finally, the service provider's transport network is protected against malicious or incompetent customers.

What is claimed is:

1. For use in an edge device of a transport network adapted to provide a transparent LAN segment service, a method, implemented by one or more processors, for processing ingress data received by a port of the edge device, the method comprising:

a) selecting a set of forwarding information based on the port on which the data is received, wherein the forwarding information includes at least one entry including a layer 2 address, a label associated with the layer 2 address, and an edge device identifier associated with the layer 2 address;

b) selecting one of the at least one entry of the selected forwarding information based on a layer 2 address of the ingress data received;

c) adding the label of the selected one of the at least one entry of the selected forwarding information to the ingress data received to generate modified data; and d) forwarding the modified data towards an edge device identified by the edge device identifier of the selected one of the at least one entry of the selected forwarding information, wherein the act of selecting one of the at least one entry of the selected forwarding information is performed by attempting to match the layer 2 address of the ingress data received with the layer 2 address of each of the at least one entry, and wherein if the layer 2 address of the ingress data received does not match the layer 2 address of any of the at least one entry, then the selected entry does not include a layer 2 address, but does include at least one set of associated information, each of the at least one set of associated information including a label and an associated edge device identifier.

2. The method of claim 1 wherein the ingress data received is an Ethernet packet and wherein each layer 2 address is a media access control address.

3. The method of claim 1 wherein the act of forwarding the modified data towards an edge device identified by the edge device identifier of the selected one of the at least one entry of the selected forwarding information includes i) determining a second label based on the edge device identifier, ii) applying the second label to the modified data to generate encapsulated modified data, and iii) placing the encapsulated modified data on a label-switched path.

4. For use in an edge device of a transport network adapted to provide a transparent LAN segment service, a method, implemented by one or more processors, for processing ingress data received by a port of the edge device, the method comprising:

a) selecting a set of forwarding information based on the port on which the data is received, wherein the forwarding information includes at least one entry including a layer 2 address, a label associated with the layer 2 address, and an edge device identifier associated with the layer 2 address;

b) selecting one of the at least one entry of the selected forwarding information based on a layer 2 address of the ingress data received;

c) adding the label of the selected one of the at least one entry of the selected forwarding information to the ingress data received to generate modified data; and d) forwarding the modified data towards an edge device identified by the edge device identifier of the selected one of the at least one entry of the selected forwarding information, wherein the port of the edge device is associated with a set of labels and a particular transparent LAN segment, and wherein the set of labels is defined by a label base and a label range.

5. The method of claim 4 wherein the set of labels is further defined by a label block offset, a second label base, and a second label range.

6. For use in an edge device of a transport network adapted to provide a transparent LAN segment service, a method, implemented by one or more processors, for processing egress data, having a label, received by the edge device, the method comprising:

a) determining a port of the edge device based on at least one of the label and a layer 2 address of the egress data; and b) providing at least a part of the egress data to the port determined, wherein the act of determining a port of the edge device based on the label and a layer 2 address of the egress data includes i) selecting a label block based on the label of the egress data, ii) determining a port identifier based on the label block selected and the label, iii) selecting a set of forwarding information based on the port identifier determined, wherein the forwarding information includes at least one entry including a layer 2 address and a port associated with the layer 2 address, iv) selecting one of the at least one entry of the selected forwarding information based on a layer 2 address of the egress data received, and v) determining the port of the edge device to be the port associated with the layer 2 address of the selected one of the at least one entry of the selected forwarding information.

7. The method of claim 6 wherein the determined port identifier is associated with a transparent LAN segment, wherein the act of selecting one of the at least one entry of the selected forwarding information is performed by attempting to match the layer 2 address of the egress data with the layer 2 address of each of the at least one entry, and wherein if the layer 2 address of the egress data does not match the layer 2 address of any of the at least one entry, then at least a part of the egress data is placed on all local ports of the edge device that are associated with the transparent LAN segment.

8. The method of claim 6 wherein the egress data is an Ethernet packet provided with a label, and wherein each layer 2 address is a media access control address.

9. The method of claim 6 wherein the port of the edge device is associated with a set of labels and a particular transparent LAN segment.

10. The method of claim 9 wherein the set of labels is defined by a label base and a label range.

11. For use in an edge device of a transport network adapted to provide a transparent LAN segment service, a method, implemented by one or more processors, for processing egress data, having a label, received by the edge device, the method comprising:

a) determining a port of the edge device based on at least one of the label and a layer 2 address of the egress data; and b) providing at least a part of the egress data to the port determined, wherein the act of determining a port of the edge device based on the label and a layer 2 address of the egress data includes i) selecting a set of forwarding information based on the label of the egress data, wherein the forwarding information includes at least one entry including a layer 2 address and a port associated with the layer 2 address, ii) selecting one of the at least one entry of the selected forwarding information based on a layer 2 address of the egress data received, and iii) determining the port of the edge device to be the port associated with the layer 2 address of the selected one of the at least one entry of the selected forwarding information, and wherein the act of selecting one of the at least one entry of the selected forwarding information is performed by attempting to match the layer 2 address of the egress data with the layer 2 address of each of the at least one entry.

12. For use in an edge device of a transport network adapted to provide a transparent LAN segment service, a method, implemented by one or more processors, for processing egress data, having a label, received by the edge device, the method comprising:

a) determining a port of the edge device based on at least one of the label and a layer 2 address of the egress data; and b) providing at least a part of the egress data to the port determined, wherein the port of the edge device is associated with a set of labels and a particular transparent LAN segment, and wherein the set of labels is defined by a first label base, a first label range, a label block offset, a second label base, and a second label range.

13. A method, implemented by one or more processors, for generating, by a transport network edge device, information about a newly added port belonging to a transparent LAN segment, to be disseminated to other edge devices of the transport network, the method comprising:

a) obtaining a label base value and a label range value associated with the newly added port;

b) generating at least one message, the at least one message collectively including
   i) a first field for identifying the transport network edge device;
   ii) a second field for identifying the transparent LAN segment to which the newly added port belongs;
   iii) a third field for identifying the newly added port;
   iv) a fourth field for identifying the range value; and
   v) a fifth field for identifying the label base.

14. The method of claim 13 further comprising:
defining a set of labels based on the label base value and the label range value.

15. The method of claim 14 wherein the set of labels is contiguous.

16. The method of claim 13 wherein a value in the third field for identifying the newly added port is unique within the transparent LAN segment identified in the second field.

17. The method of claim 13 further comprising:
   c) sending the message towards other edge devices of the transport network.

18. The method of claim 17 wherein the message is associated with a group for targeting the distribution of the message.

19. The method of claim 18 wherein the message is sent using a border gateway protocol, and
   wherein the group is a route target BGP extended community.

20. The method of claim 13 wherein the at least one message further collectively includes:
   vi) a sixth field for defining a second label base,
   vii) a seventh field for defining a second label range associated with the second label base, and
   viii) an eighth field for defining a label block offset associated with the second label base and the second label range.

21. A method, implemented by one or more processors, for processing, by a first transport network edge device, information about a newly added port of a second transport network edge device belonging to a transparent LAN segment, the method comprising:
   a) determining a label for getting to newly added port of the second transport network edge device based on the information;
   b) determining an identity of the second transport network edge device based on the information; and
   c) generating an entry of a forwarding table used by the first transport network edge device and associated with the transparent LAN segment, the entry including the label determined and the identity of the second transport network edge
device, wherein the entry associates the label determined and the identity of the second transport network edge device.

22. The method of claim 21 wherein the information about a newly added port includes:
   a first value identifying the second transport network edge device;
   a second value identifying the transparent LAN segment;
   a third value identifying the newly added port;
   a fourth value identifying a label range associated with the newly added port; and
   a fifth value identifying a label base associated with the newly added port.

23. The method of claim 22 wherein the forwarding table is associated with the transparent LAN segment identified by the second value of the information, and
   wherein the entry is associated with a local port of the first transport network edge device.

24. The method of claim 23 wherein the act of determining a label for getting to newly added port of the second transport network edge device based on the information includes
   determining a value based on the local port of the first transport network and the label base identified by the fifth value.

25. The method of claim 22 wherein the information about a newly added port further includes:
   a sixth value identifying a second label range associated with the newly added port;
   a seventh value identifying a second label base associated with the newly added port; and
   an eighth value identifying a label block offset associated with the second label range and the second label base.

26. The method of claim 21 wherein the information is included in a message associated with group for targeting the distribution of the message.

27. The method of claim 26 wherein the message is sent using a border gateway protocol, and
   wherein the group is a route target BGP extended community.

28. The method of claim 27 wherein the forwarding table is associated with the same route target BGP extended community as that of the message.

29. For use by an egress edge device of a transport network supporting a transparent LAN segment service, a method, implemented by one or more processors, for populating a forwarding table associated with a transparent LAN segment based on data received, the data received including a label and a layer 2 source address, the method comprising:
   a) determining an edge device of the transport network on which the data entered the transport network based on the label of the data received;
   b) determining a port of the determined edge device on which the data entered the determined edge device based on the label of the data received; and
   c) generating an entry in the forwarding table, the entry including
      i) a layer 2 address set to the layer 2 source address of the data,
      ii) an egress edge device identifier based on the determined edge device, and
      iii) a label associated with the determined port,
wherein the egress edge device stores label information associated with the port determined, and
   wherein the port is determined based on the stored label information and the label of the data received.

30. The method of claim 29 wherein the label information includes a label base, and a label range,
   wherein the label of the data received is greater than or equal to the label base, but is less than the sum of the label base and the label range, and
   wherein the port is determined based on the label of the data received and the label base.

31. The method of claim 30 wherein the label information further includes a label block offset, and
   wherein the port is determined based on the label of the data received, the label base and the label block offset.

32. The method of claim 29 wherein the data received is an Ethernet packet and wherein each of the layer 2 addresses is a media access control address.

33. A storage device storing processor-executable instructions which, when executed by a processor, perform a method for processing ingress data received by a port of the edge device, the method comprising:

a) selecting a set of forwarding information based on the port on which the data is received, wherein the forwarding information includes at least one entry including a layer 2 address, a label associated with the layer 2 address, and an edge device identifier associated with the layer 2 address;
   b) selecting one of the at least one entry of the selected forwarding information based on a layer 2 address of the ingress data received;
   c) adding the label of the selected one of the at least one entry of the selected forwarding information to the ingress data received to generate modified data; and
   d) forwarding the modified data towards an edge device identified by the edge device identifier of the selected one of the at least one entry of the selected forwarding information,
   wherein the port of the edge device is associated with a set of labels and a particular transparent LAN segment, and
   wherein the set of labels is defined by a label base and a label range.

34. A storage device storing processor-executable instructions which, when executed by a processor, perform a method for processing egress data, having a label, received by the edge device, the method comprising:
   a) determining a port of the edge device based on at least one of the label and a layer 2 address of the egress data; and
   b) providing at least a part of the egress data to the port determined,
   wherein the port of the edge device is associated with a set of labels and a particular transparent LAN segment, and
   wherein the set of labels is defined by a first label base, a first label range, a label block offset, a second label base, and a second label range.

35. A storage device storing processor-executable instructions which, when executed by a processor, perform a method for generating, by a transport network edge device, information about a newly added port belonging to a transparent LAN segment, to be disseminated to other edge devices of the transport network, the method comprising:
   a) obtaining a label base value and a label range value associated with the newly added port;
   b) generating at least one message, the at least one message collectively including
      i) a first field for identifying the transport network edge device;
      ii) a second field for identifying the transparent LAN segment to which the newly added port belongs;
      iii) a third field for identifying the newly added port;
      iv) a fourth field for identifying the range value; and
      v) a fifth field for identifying the label base.

36. A storage device storing processor-executable instructions which, when executed by a processor, perform a method for processing, by a first transport network edge device, information about a newly added port of a second transport network edge device belonging to a transparent LAN segment, the method comprising:
   a) determining a label for getting to newly added port of the second transport network edge device based on the information;
   b) determining an identity of the second transport network edge device based on the information; and
   c) generating an entry of a forwarding table used by the first transport network edge device and associated with the transparent LAN segment, the entry including the label determined and the identity of the second transport network edge device, wherein the entry associates the label determined and the identity of the second transport network edge device.

37. A storage device storing processor-executable instructions which, when executed by a processor, perform a method for populating a forwarding table associated with a transparent LAN segment based on data received, the data received including a label and a layer 2 source address, the method comprising:
   a) determining an edge device of the transport network on which the data entered the transport network based on the label of the data received;
   b) determining a port of the determined edge device on which the data entered the determined edge device based on the label of the data received; and
   c) generating an entry in the forwarding table, the entry including
      i) a layer 2 address set to the layer 2 source address of the data,
      ii) an egress edge device identifier based on the determined edge device, and
      iii) a label associated with the determined port,
      wherein the egress edge device stores label information associated with the port determined, and
      wherein the port is determined based on the stored label information and the label of the data received.

* * * * *